US012736023B2

(12) United States Patent
Liu et al.

(10) Patent No.: US 12,736,023 B2
(45) Date of Patent: Sep. 15, 2026

(54) HYBRID ELECTRIC VEHICLE AND ENGINE START-STOP CONTROL METHOD AND DEVICE THEREOF

(71) Applicants: Aurobay (Ningbo) Intelligent Technology Co., Ltd., Ningbo (CN); AUROBAY TECHNOLOGY CO., LTD., Ningbo (CN); ZHEJIANG GEELY HOLDING GROUP CO., LTD, Hangzhou (CN)

(72) Inventors: Yiqiang Liu, Hangzhou (CN); Junchao Jing, Hangzhou (CN); Jie Wu, Hangzhou (CN); Yongjian Wang, Hangzhou (CN); Wensong Guo, Hangzhou (CN); Bing Hui, Hangzhou (CN); Ruiping Wang, Hangzhou (CN); Ingo Scholten, Hangzhou (CN)

(73) Assignees: Aurobay (Ningbo) Intelligent Technology Co., Ltd., Ningbo (CN); AUROBAY TECHNOLOGY CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 264 days.

(21) Appl. No.: 18/287,913

(22) PCT Filed: Aug. 19, 2021

(86) PCT No.: PCT/CN2021/113557

§ 371 (c)(1),
(2) Date: Oct. 23, 2023

(87) PCT Pub. No.: WO2023/019514

PCT Pub. Date: Feb. 23, 2023

(65) Prior Publication Data

US 2024/0191680 A1 Jun. 13, 2024

(51) Int. Cl.
*B60W 10/06* (2006.01)
*B60W 10/08* (2006.01)
(Continued)

(52) U.S. Cl.
CPC ......... *F02N 11/0822* (2013.01); *B60W 10/06* (2013.01); *B60W 10/08* (2013.01);
(Continued)

(58) Field of Classification Search
CPC ............ F02N 11/0822; F02N 2200/02; F02N 2200/024; F02N 2200/061;
(Continued)

(56) References Cited

U.S. PATENT DOCUMENTS 6,321,143 B1 11/2001 Phillips et al.
2016/0200316 A1* 7/2016 Orita .................... B60W 20/40 180/65.265

(Continued)

FOREIGN PATENT DOCUMENTS

CN 103661402 A 3/2014
CN 106274892 A 1/2017

(Continued)

OTHER PUBLICATIONS

Office Action issued in counterpart European Patent Application No. 21942130.2, dated Jul. 17, 2024.

(Continued)

*Primary Examiner* — Tisha D Lewis
(74) *Attorney, Agent, or Firm* — Westbridge IP LLC

(57) ABSTRACT

An engine start-stop control method and device for a hybrid electric vehicle, and a hybrid electric vehicle belong to the technical field of vehicles. The method includes: obtaining a target parameter or a target signal, which is engine start-stop related, of the hybrid electric vehicle; determining, according to the target parameter or target signal, whether an (Continued)

engine start-stop related event occurs; if so, determining a level of the engine start-stop related event; and performing engine start-stop control according to the engine start-stop related event and the level thereof; wherein the engine start-stop related event includes at least one of the following: an energy management related start-stop event, a driving behavior related start-stop event, an engine state related start-stop event, an external controller request start-stop event, and other condition related start-stop events. The operating efficiency of the vehicle and the user experience are improved.

10 Claims, 10 Drawing Sheets

(51) Int. Cl.

| | |
|---|---|
| ***B60W 10/26*** | (2006.01) |
| ***B60W 10/30*** | (2006.01) |
| ***B60W 20/13*** | (2016.01) |
| ***B60W 20/15*** | (2016.01) |
| ***B60W 50/00*** | (2006.01) |
| ***F02N 11/08*** | (2006.01) |
| ***G07C 5/08*** | (2006.01) |

(52) U.S. Cl.

CPC ............ *B60W 10/26* (2013.01); *B60W 10/30* (2013.01); *B60W 20/13* (2016.01); *B60W 20/15* (2016.01); *B60W 50/00* (2013.01); *G07C 5/0808* (2013.01); *B60W 2050/0026* (2013.01); *B60W 2510/0619* (2013.01); *B60W 2510/0623* (2013.01); *B60W 2510/0676* (2013.01); *B60W 2510/1005* (2013.01); *B60W 2510/244* (2013.01); *B60W 2520/10* (2013.01); *B60W 2530/211* (2020.02); *B60W 2540/10* (2013.01); *B60W 2710/06* (2013.01); *B60W 2710/083* (2013.01); *B60W 2710/244* (2013.01); *B60W 2710/30* (2013.01); *F02N 2200/02* (2013.01); *F02N 2200/024* (2013.01); *F02N 2200/061* (2013.01); *F02N 2200/0801* (2013.01); *F02N 2200/0802* (2013.01); *F02N 2200/10* (2013.01)

(58) Field of Classification Search

CPC ..... F02N 2200/0801; F02N 2200/0802; F02N 2200/10; F02N 11/0825; F02N 11/0829; F02N 2200/023; F02N 2200/026; F02N 2200/122; F02N 2200/14; F02N 11/0833; F02N 11/0837; F02N 11/0803; F02N 2011/0881; B60W 10/06; B60W 10/08; B60W 10/26; B60W 10/30; B60W 20/13; B60W 20/15; B60W 50/00; B60W 2050/0026; B60W 2510/0619; B60W 2510/0623; B60W 2510/0676; B60W 2510/1005; B60W 2510/244; B60W 2520/10; B60W 2530/211; B60W 2540/10; B60W 2710/06; B60W 2710/083; B60W 2710/244; B60W 2710/30; B60W 2030/082; B60W 2050/0093; B60W 2050/022; B60W 2510/0604; B60W 2510/30; B60W 2555/20; B60W 30/18018; G07C 5/0808; B60K 6/442

See application file for complete search history.

(56) References Cited

U.S. PATENT DOCUMENTS

| | | | | |
|---|---|---|---|---|
| 2020/0298726 | A1 | 9/2020 | Satoh et al. | |
| 2022/0397087 | A1* | 12/2022 | Li | F02N 11/0829 |

FOREIGN PATENT DOCUMENTS

| | | | |
|---|---|---|---|
| CN | 110254428 | A | 9/2019 |
| CN | 111891107 | A | 11/2020 |
| CN | 112160857 | A | 1/2021 |
| CN | 112677954 | A | 4/2021 |
| EP | 3045367 | A1 | 7/2016 |
| JP | 2012086771 | A | 5/2012 |
| JP | 2013252853 | A | 12/2013 |
| KR | 20200115823 | A | 10/2020 |
| WO | 2015032321 | A1 | 3/2015 |
| WO | 2019227823 | A1 | 12/2019 |
| WO | 2021103966 | A1 | 6/2021 |

OTHER PUBLICATIONS

Chinese Intellectual Property Office (ISR/CN), "International Search Report for PCT/CN2021/113557", China, May 24, 2022.
EPO, "Supplementary European Search Report for EP Application No. 21942130.2", Munich, Germany, Sep. 21, 2023.
First Office Action issued in counterpart Chinese Patent Application No. 202180004591.8, dated Mar. 12, 2026.
Notification to Grant Patent Right for Invention issued in counterpart Chinese Patent Application No. 202180004591.8, dated Jul. 21, 2026.

* cited by examiner

Begin

Obtain a target parameter, which is engine start-stop related, of the hybrid electric vehicle

S802

When the current operating mode of the vehicle is a power mode or a manual mode, determine that the power mode or the manual mode activation occurs

S804

Determine a level of the engine start-stop related event

S806

Request and control the engine to start

S808

End

Begin

S1302
Obtain a target signal, which is engine start-stop related, of the hybrid electric vehicle S1304
When the start request signal of the air conditioner controller is received, determine that the air conditioner controller request start occurs S1306
Determine a level of the engine start-stop related event S1308
Request and control the engine to start End

HYBRID ELECTRIC VEHICLE AND ENGINE START-STOP CONTROL METHOD AND DEVICE THEREOF

CROSS-REFERENCE TO RELATED PATENT APPLICATION

This application is a U.S. national stage application of PCT Patent Application No. PCT/CN2021/113557 filed Aug. 19, 2021, which is incorporated herein in its entirety by reference.

FIELD OF THE INVENTION

The present invention relates to the technical field of vehicles, and in particular to an engine start-stop control method and device for a hybrid electric vehicle, and a hybrid electric vehicle.

BACKGROUND OF THE INVENTION

With the increasingly stringent requirements for vehicle fuel consumption and emission in various countries and the development of an electrification system, the hybrid power technology has become the key to achieve energy saving and emission reduction of the vehicles. Due to the complex battery technology and high cost of the current pure electric system, the hybrid power system is widely promoted. A dual-motor hybrid power system is a high-efficiency hybrid power system, and its general structure is as shown in FIG. 1. The dual-motor hybrid power system generally has the following three modes: a pure electric mode, a series mode and a parallel mode. In the series mode, a clutch C0 is disengaged, an engine charges a battery through a motor P1, and the battery supplies power to a motor P2 so that P2 drives wheels. In the parallel mode, the clutch C0 is engaged and the engine directly drives the wheels.

In practical applications, the hybrid power system faces various different situations, such as a driver request torque exceeds a certain threshold, a driver request power exceeds a certain threshold, the state of charge (SOC) of the battery falls below a certain threshold, the water temperature of the engine is too high or too low, the environment temperature in winter is low, the battery and the motor are faulty, and so on. In these different situations, how to reasonably perform an engine start-stop control to meet a driver's request, balance fuel consumption, protect the battery, and improve the comfort of passengers in winter is urgently needed in the art.

BRIEF DESCRIPTION OF THE INVENTION

In view of the above problems, proposed are an engine start-stop control method and device for a hybrid electric vehicle, and a hybrid electric vehicle, which overcome the above problems or solve at least some of the above problems.

An object of the present invention is to provide an engine start-stop control method for a hybrid electric vehicle, which, by classifying and defining engine start-stop related events, and grading these events, can reasonably perform an engine start-stop control according to an event and its level.

A further object of the present invention is to ensure that the engine start-stop control can not only meet a driver's request, but also balance fuel consumption, protect a battery, and improve the comfort of passengers in winter.

In particular, according to an aspect of the embodiments of the present invention, provided is an engine start-stop control method for a hybrid electric vehicle, including:

obtaining a target parameter or a target signal, which is engine start-stop related, of the hybrid electric vehicle;

determining, according to the target parameter or target signal, whether an engine start-stop related event occurs;

if so, determining a level of the engine start-stop related event; and performing engine start-stop control according to the engine start-stop related event and the level thereof; wherein the engine start-stop related event includes at least one of the following: an energy management related start-stop event, a driving behavior related start-stop event, an engine state related start-stop event, an external controller request start-stop event, and other condition related start-stop events.

Optionally, the level of the engine start-stop related event includes a first level and a second level, and the second level is higher than the first level;

when the level of the engine start-stop related event is the first level, the step of performing engine start-stop control according to the engine start-stop related event and the level thereof includes:

keeping the engine in operation under the condition that the engine has operated;

when the level of the engine start-stop related event is the second level, the step of performing engine start-stop control according to the engine start-stop related event and the level thereof includes:

requesting and controlling the engine to start under the condition that the engine has stopped.

Optionally, when a plurality of engine start-stop related events occur, the engine start-stop control is performed according to the highest level of the plurality of engine start-stop related events.

Optionally, the level of the energy management related start-stop event is the second level, and the energy management related start-stop event includes at least one of the following: driver demand power related start-stop, battery power balance related start-stop, battery SOC protection related start-stop, and battery available discharge power related start-stop.

Optionally, the target parameter includes a current operating state of the engine, a temperature of engine coolant, a current vehicle speed, an actual SOC value of a battery, a target SOC value of the battery, and a driver demand power; the driver demand power related start-stop includes driver demand power related start and driver demand power related stop;

the step of determining, according to the target parameter, whether an engine start-stop related event occurs includes:

determining, according to the current operating state of the engine, whether the current state of the engine is operating or stopped;

when the current state of the engine is stopped, determining a start power limit of the engine according to the temperature of the engine coolant, the current vehicle speed, the actual SOC value of the battery and the target SOC value of the battery;

determining whether the driver demand power is greater than the start power limit, and if so, determining that the driver demand power related start occurs;

when the current state of the engine is operating, determining a stop power limit of the engine according to the current vehicle speed, the actual SOC value of the battery and the target SOC value of the battery; and determining whether the driver demand power is less than the stop power limit, and if so, determining that the driver demand power related stop occurs;

the step of performing engine start-stop control according to the engine start-stop related event and the level thereof includes:

when it is determined that the driver demand power related start occurs, requesting and controlling the engine to start; and when it is determined that the driver demand power related stop occurs, requesting and controlling the engine to stop.

Optionally, the target parameter includes the current operating state of the engine, the current vehicle speed, and the actual SOC value of the battery;

the step of determining, according to the target parameter, whether an engine start-stop related event occurs includes:

when the current operating state of the engine is stopped, determining a start SOC limit and a stop SOC limit according to the current vehicle speed; and determining whether the actual SOC value of the battery is less than the start SOC limit, and if so, determining that the battery power balance related start-stop occurs;

the step of performing engine start-stop control according to the engine start-stop related event and the level thereof includes:

requesting and controlling the engine to start to charge the battery; and when the actual SOC value of the battery reaches the stop SOC limit, requesting and controlling the engine to stop.

Optionally, after determining that the battery power balance related start-stop occurs, the step of determining, according to the target parameter, whether an engine start-stop related event occurs further includes:

determining whether the actual SOC value of the battery is less than a preset charging priority enter limit;

the step of performing engine start-stop control according to the engine start-stop related event and the level thereof further includes:

when it is determined that the actual SOC value of the battery is less than the preset charging priority enter limit, after the engine is requested and controlled to start, first charging the battery in a charging priority mode until the actual SOC value of the battery reaches a preset charging priority exit limit; and then charging the battery in a general charging mode.

Optionally, the target parameter includes an actual SOC value of the battery;

the step of determining, according to the target parameter, whether an engine start-stop related event occurs includes:

determining whether the actual SOC value of the battery is less than a preset battery SOC protection limit, the battery SOC protection limit being the sum of a minimum SOC value allowable for the battery and a predetermined margin; and if so, determining that the battery SOC protection related start-stop occurs;

the step of performing engine start-stop control according to the engine start-stop related event and the level thereof includes:

requesting and controlling the engine to start to charge the battery until the actual SOC value of the battery is higher than the preset battery SOC protection limit.

Optionally, the target parameter includes a temperature of a battery and/or an actual SOC value of the battery, and a vehicle operating demand power;

the step of determining, according to the target parameter, whether an engine start-stop related event occurs includes:

determining an available discharge power of the battery according to the temperature of the battery and/or the actual SOC value of the battery; and determining whether the available discharge power of the battery is less than the vehicle operating demand power, and if so, determining that the battery available discharge power related start-stop occurs;

the step of performing engine start-stop control according to the engine start-stop related event and the level thereof includes:

requesting and controlling the engine to start to drive the vehicle to operate.

Optionally, the level of the driving behavior related start-stop event is the second level, and the driving behavior related start-stop event includes at least one of the following: power mode or manual mode activation, in-situ park/neutral (P/N) gear high-throttle start, kickdown trigger, drive/reverse (D/R) gear high-throttle acceleration, and too high vehicle speed in a pure electric mode.

Optionally, the target parameter includes a current operating mode of the vehicle;

the step of determining, according to the target parameter, whether an engine start-stop related event occurs includes:

when the current operating mode of the vehicle is a power mode or a manual mode, determining that the power mode or the manual mode activation occurs;

the step of performing engine start-stop control according to the engine start-stop related event and the level thereof includes:

requesting and controlling the engine to start.

Optionally, the target parameter includes a current gear and a throttle opening of the vehicle;

the step of determining, according to the target parameter, whether an engine start-stop related event occurs includes:

when the current gear of the vehicle is a P/N gear, determining whether the throttle opening is greater than a first throttle opening, and if so, determining that in-situ P/N gear high-throttle start occurs;

the step of performing engine start-stop control according to the engine start-stop related event and the level thereof includes:

requesting and controlling the engine to start, and when the throttle opening drops to a second throttle opening, delaying a first preset duration and then controlling the engine to stop, the second throttle opening being less than the first throttle opening.

Optionally, the target parameter includes a throttle state;

the step of determining, according to the target parameter, whether an engine start-stop related event occurs includes:

when the throttle state is a kickdown trigger state, determining that the kickdown trigger occurs;

the step of performing engine start-stop control according to the engine start-stop related event and the level thereof includes:

requesting and controlling the engine to start.

Optionally, the target parameter includes a current gear of the vehicle, a current operating mode of the vehicle, a driver request torque, a maximum motor available torque, a current operating state of the engine, and a current vehicle speed; the D/R gear high-throttle acceleration includes D/R gear high-throttle acceleration start and D/R gear high-throttle acceleration stop;

the step of determining, according to the target parameter, whether an engine start-stop related event occurs includes:

when the current gear of the vehicle is a D/R gear, determining, according to the current operating state of the engine, whether the current state of the engine is operating or stopped;

when the current state of the engine is stopped, looking up a table according to the current vehicle speed and the current operating mode of the vehicle to obtain a start torque correction limit;

determining whether the driver request torque is greater than the sum of the maximum motor available torque and the start torque correction limit, and if so, determining that the D/R gear high-throttle acceleration start occurs;

when the current state of the engine is operating, looking up a table according to the current vehicle speed to obtain a stop torque correction limit; and determining whether the driver request torque is less than a difference between the maximum motor available torque and the stop torque correction limit, and if so, determining that the D/R gear high-throttle acceleration stop occurs;

the step of performing engine start-stop control according to the engine start-stop related event and the level thereof includes:

when it is determined that the D/R gear high-throttle acceleration start occurs, requesting and controlling the engine to start;

when it is determined that the D/R gear high-throttle acceleration stop occurs, requesting and controlling the engine to stop.

Optionally, the target parameter includes a current operating mode and a current vehicle speed of the vehicle;

the step of determining, according to the target parameter, whether an engine start-stop related event occurs includes:

when the current operating mode of the vehicle is a pure electric mode, determining whether the current vehicle speed is higher than a preset start vehicle speed; and if so, determining that the too high vehicle speed in the pure electric mode occurs;

the step of performing engine start-stop control according to the engine start-stop related event and the level thereof includes:

requesting and controlling the engine to start.

Optionally, the engine state related start-stop event includes at least one of the following: insufficient oxygen storage capacity of a catalytic converter, the level of which is the second level;

too high temperature of the catalytic converter, the level of which is the first level;

too high environment temperature, the level of which is the second level;

too high temperature of engine coolant, the level of which is the first level;

too low temperature of the engine coolant, the level of which is the second level;

too high pre-turbine temperature of a supercharger, the level of which is the first level;

too high temperature of engine oil, the level of which is the first level;

too large load of a canister, the level of which is the first level;

over-limit cumulative stop time of the engine, the level of which is the second level;

engine oil dilution, the level of which is the first level;

heating of the catalytic converter, the level of which is the first level;

closed-loop diagnosis of an oxygen sensor, the level of which is the first level;

aging of fuel, the level of which is the second level.

Optionally, when fuel cutoff occurs or an air-fuel ratio is less than a preset ratio, it is determined that the oxygen storage capacity of the catalytic converter is insufficient;

when the temperature of the catalytic converter is greater than a first temperature threshold, it is determined that the temperature of the catalytic converter is too high;

when the environment temperature is greater than a second temperature threshold, it is determined that the environment temperature is too high;

when the temperature of the engine coolant is greater than a third temperature threshold, it is determined that the temperature of the engine coolant is too high;

when the temperature of the engine coolant is less than a fourth temperature threshold, it is determined that the temperature of the engine coolant is too low, and after started, the engine is kept in operation until the temperature of the engine coolant reaches a target temperature threshold;

when the pre-turbine temperature of the supercharger is greater than a fifth temperature threshold, it is determined that the pre-turbine temperature of the supercharger is too high;

when the temperature of engine oil is greater than a sixth temperature threshold, it is determined that the temperature of the engine oil is too high;

when the load of the canister is greater than a preset load, it is determined that the load of the canister is too large;

when the cumulative stop time of the engine in a driving cycle is greater than a preset stop time threshold, it is determined that the cumulative stop time of the engine is over-limit, and the canister is flushed after the engine is started;

when the viscosity of the engine oil is less than a preset viscosity value, it is determined that the engine oil is diluted;

when the catalytic converter satisfies a heating condition and the engine has started, it is determined that the catalytic converter is heated, and under the situation that the engine has operated, the engine is kept in operation until the heating of the catalytic converter ends;

when the oxygen sensor has a closed-loop diagnosis demand, it is determined that the oxygen sensor is subjected to closed-loop diagnosis, and under the condition that the engine has operated, the engine is kept in operation until the closed-loop diagnosis is completed;

when a fuel age of the engine is greater than a fuel age threshold, it is determined that the fuel is aged, wherein the fuel age threshold is obtained by looking up a table according to the current temperature of the engine coolant.

Optionally, the level of the external controller request start-stop event is the second level, and the external controller request start-stop event includes at least one of the following: air conditioner controller request start and driver leaving request start;

the target signal includes a start request signal of an air conditioner controller;

the step of determining, according to the target parameter, whether an engine start-stop related event occurs includes:

when the start request signal of the air conditioner controller is received, determining that the air conditioner controller request start occurs; and/or the target parameter includes a current operating state of the vehicle, a current vehicle speed and a driver state;

the step of determining, according to the target parameter, whether an engine start-stop related event occurs includes:

when the current operating state of the vehicle is a driving cycle activation state, the current vehicle speed is 0, and the driver state is leaving, determining that the driver leaving request start occurs.

Optionally, the other condition related start-stop events include at least one of the following:

fan control related start-stop, the level of which is the first level;

factory mode request start-stop, the level of which is the second level;

related start-stop after vehicle collision, the level of which is the second level;

remote start request start-stop, the level of which is the second level;

minimum operating time related start-stop, the level of which is the first level;

low motor available torque, the level of which is the second level;

start after engine start failure, the level of which is the second level;

battery failure request start, the level of which is the second level;

motor failure request start, the level of which is the second level.

Optionally, when the engine has operated and the duty ratio of fan control is higher than a calibrated threshold, it is determined that the fan control related start-stop occurs, and under the condition that the engine has operated, the engine is kept in operation until the duty ratio of fan control is lower than the calibrated threshold;

when a factory mode of the vehicle is triggered, it is determined that the factory mode request start-stop occurs;

after the vehicle collides, it is determined that the related start-stop after vehicle collision occurs;

when a remote start request is received from a driver, it is determined that the remote start request start-stop occurs;

when the engine is being started or after the engine has been successfully started, it is determined that the minimum operating time related start-stop occurs, and the engine is kept in operation for at least a second preset duration under the condition that the engine has operated;

when a ratio of the available torque of the motor to the maximum torque of the motor is less than a preset ratio, it is determined that the low motor available torque occurs;

when a battery fails, it is determined that the battery failure request start occurs;

when the mode of the motor does not respond to a request, a torque output path of the motor does not respond to a request, or the mode of the motor is a failure mode, it is determined that the motor failure request start occurs.

According to another aspect of the embodiments of the present invention, further provided is an engine start-stop control device for a hybrid electric vehicle, including a memory and a processor, and the memory storing a control program that, when executed by the processor, is used to implement any one of the engine start-stop control methods above.

According to yet another aspect of the embodiments of the present invention, further provided is a hybrid electric vehicle, including a hybrid power system and the foregoing engine start-stop control device for the hybrid electric vehicle.

In the hybrid electric vehicle and the engine start-stop control method and device thereof provided by the present invention, engine start-stop control can be reasonably performed for various situations that may occur in the vehicle by determining an engine start-stop related event, which is at least one of an energy management related start-stop event, a driving behavior related start-stop event, an engine state related start-stop event, an external controller request start-stop event and other condition related start-stop events, determining the level of the engine start-stop related event, and then performing engine start-stop control according to the engine start-stop related event and the level thereof, thereby improving the operating efficiency of the vehicle and the user experience.

Further, by specifically defining the determination condition and level of each engine start-stop related event, and defining a corresponding start-stop control measure for each different engine start-stop related event, it is ensured that the engine start-stop control can not only meet a driver's request, but also can balance fuel consumption, protect the battery, and improve the comfort of passengers in winter.

The above description is only an overview of the technical solution of the present invention. To understand more clearly the technical means of the present invention, to implement in accordance with the contents of the specification, and to make the above and other purposes, features and advantages of the present invention more apparent and understandable, specific embodiments of the present invention are described below.

According to detailed description of specific embodiments of the present invention with the combination of drawings, the above and other objects, advantages and features of the present invention will be better understood by those skilled in the art.

BRIEF DESCRIPTION OF THE DRAWINGS

Some specific embodiments of the present invention will be described later in detail in an exemplary and non-limiting manner with reference to the drawings. Identical reference numerals in the drawings indicate identical or similar components or parts. It should be understood by those skilled in the art that these drawings are not necessarily drawn to scale. In drawings.

DETAILED DESCRIPTION

Figure 1:
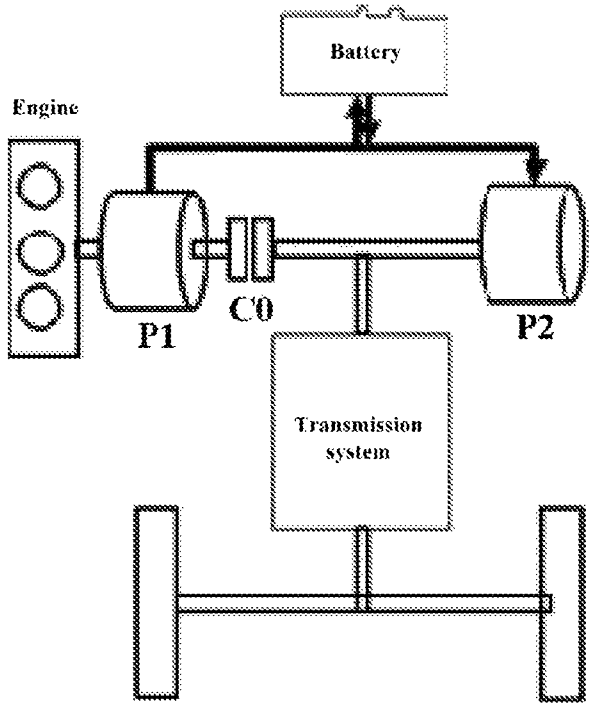
FIG. 1 is a structural schematic diagram of a dual-motor hybrid power system.

TExemplary embodiments of the present disclosure will be described in greater detail below with reference to the drawings. Although exemplary embodiments of the present disclosure are shown in the drawings, it should be understood that the present disclosure can be implemented in various forms and should not be confined by the embodiments elaborated herein. On the contrary, these embodiments are provided to enable a more thorough understanding of the present disclosure and to enable the complete scope of the present disclosure to be communicated to those skilled in the art.

In view of various different situations that a hybrid power system may face in practical applications, the present invention proposes an engine start-stop control method for a hybrid electric vehicle. The engine start-stop control method of the present invention is suitable for hybrid power systems of various configurations, and is particularly suitable for a dual-motor hybrid power system (as shown in FIG. 1).

Figure 2:
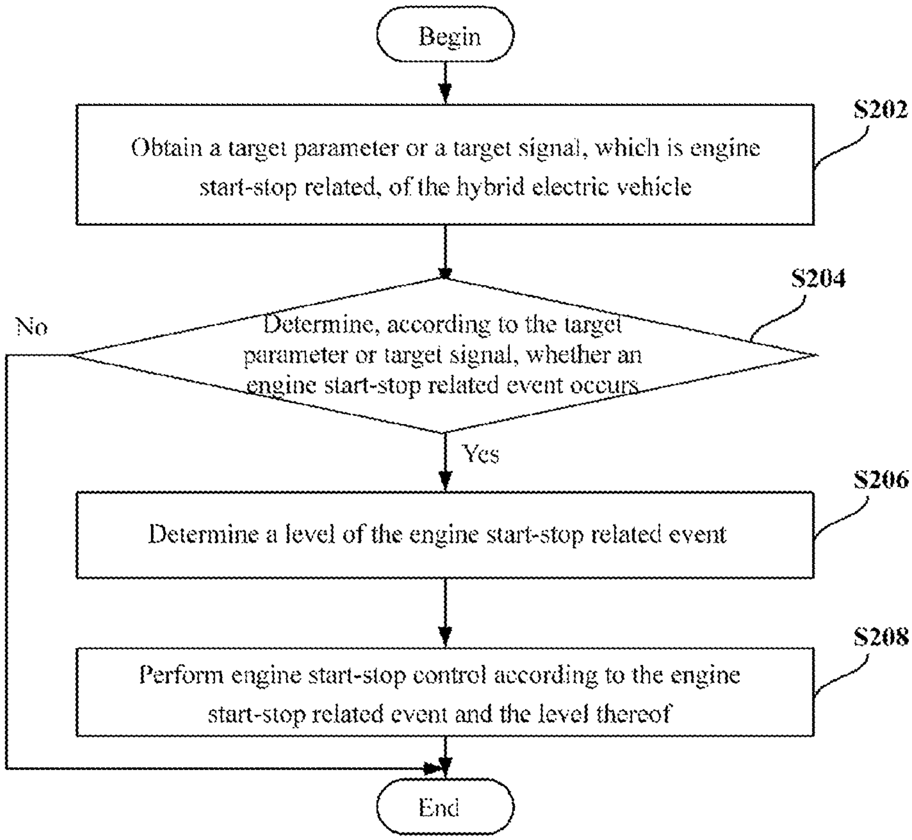
FIG. 2 is a schematic flowchart of an engine start-stop control method for a hybrid electric vehicle according to an embodiment of the present invention.

FIG. 2 is a schematic flowchart of an engine start-stop control method for a hybrid electric vehicle according to an embodiment of the present invention. Referring to FIG. 2, the engine start-stop control method may at least include step S202 to step S208 below.

Step S202, a target parameter or a target signal, which is engine start-stop related, of the hybrid electric vehicle are obtained.

Step S204, whether an engine start-stop related event occurs is determined according to the target parameter or target signal. If so, step S206 is executed, otherwise, this process ends.

Step S206, a level of the engine start-stop related event is determined.

Step S208, engine start-stop control is performed according to the engine start-stop related event and the level thereof.

In this embodiment, the engine start-stop related event may include at least one of the following: an energy management related start-stop event, a driving behavior related start-stop event, an engine state related start-stop event, an external controller request start-stop event, and other condition related start-stop events.

In the engine start-stop control method for a hybrid electric vehicle provided by the embodiment of the present invention, the engine start-stop control can be reasonably performed for various situations that may occur in the vehicle by determining an engine start-stop related event, which is at least one of the energy management related start-stop event, the driving behavior related start-stop event, the engine state related start-stop event, the external controller request start-stop event and other condition related start-stop events, determining the level of the engine start-stop related event, and then performing engine start-stop control according to the engine start-stop related event and the level thereof, thereby improving the operating efficiency of the vehicle and the user experience.

In step S206 above, the level of the engine start-stop related event can be determined by looking up a preset mapping table of engine start-stop related events and levels.

Further, the level of the engine start-stop related event includes a first level and a second level, and the second level is defined as being higher than the first level. When the level of the engine start-stop related event is the first level, the engine can only be kept in operation under the condition that the engine has operated during engine start-stop control. When the level of the engine start-stop related event is the second level, the engine can be requested and controlled to start under the condition that the engine has stopped during engine start-stop control. By different start-stop processing under different event levels, targeted start-stop control can be performed for different situations to meet vehicle operation requirements.

Under some situations, a plurality of engine start-stop related events may occur. In this case, the engine start-stop control may be performed according to the highest level of the plurality of engine start-stop related events. For example, if the levels of the determined engine start-stop related events include both the first level and the second level, the engine start-stop control is performed according to the second level. If the levels of the determined plurality of engine start-stop related events are all the first level, the engine start-stop control is performed according to the first level.

As mentioned earlier, the engine start-stop related event may include at least one of the energy management related start-stop event, the driving behavior related start-stop event, the engine state related start-stop event, the external controller request start-stop event, and other condition related start-stop events. Each engine start-stop related event has its own determination condition and level, and has its corresponding start-stop control measure. The above-mentioned engine start-stop related events are separately described below.

1. Energy Management Related Start-Stop Events

The energy management related start-stop events mainly consider start events under fuel consumption and over-limit driver demand power in an emission cycle, and start events required to protect a battery when the SOC of the battery is low and a discharge power is low. Specifically, the energy management related start-stop event may include at least one of the following: driver demand power related start-stop, battery power balance related start-stop, battery SOC protection related start-stop, and battery available discharge power related start-stop. Considering that the energy management related start-stop events are all related to meeting vehicle driving demands, the level of each energy management related start-stop event is the second level.

The engine start-stop control methods under various energy management related start-stop events are specifically described below in conjunction with Embodiment 1 to Embodiment 4.

Embodiment 1

Embodiment 1 is an engine start-stop control method based on driver demand power related start-stop. Specifically, the driver demand power related start-stop may include driver demand power related start and driver demand power related stop.

Figure 3:
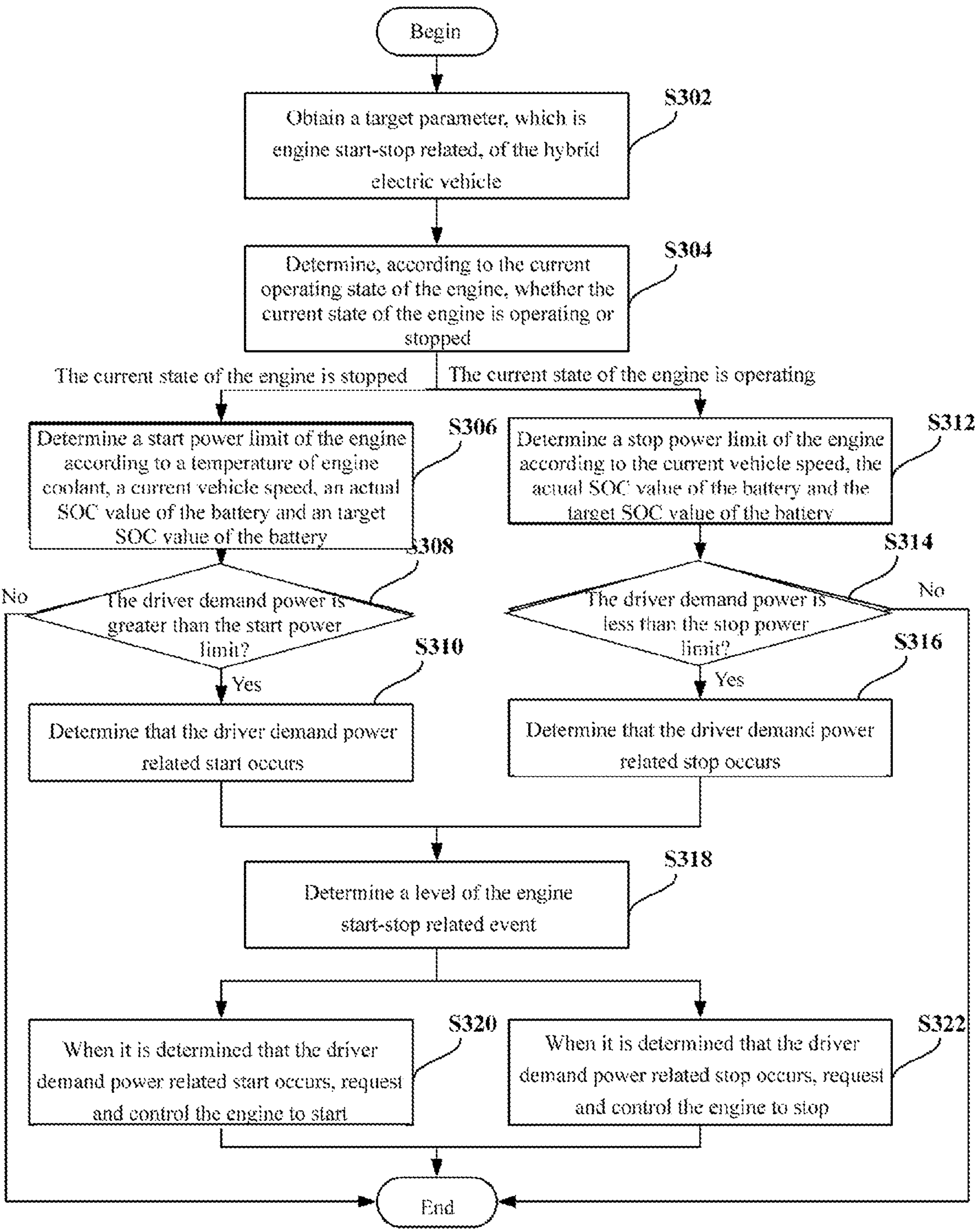
FIG. 3 is a schematic flowchart of an engine start-stop control method for a hybrid electric vehicle according to Embodiment 1 of the present invention.

Referring to FIG. 3, the engine start-stop control method of Embodiment 1 includes step S302 to step S322 below.

In step S302, a target parameter of the hybrid electric vehicle that is related to the start and stop of an engine are obtained. The target parameter specifically includes a current operating state of the engine, a temperature of an engine coolant, a current vehicle speed, an actual SOC value of a battery, a target SOC value of the battery and a driver demand power.

Step S304, whether the current state of the engine is operating or stopped is determined according to the current operating state of the engine. When the current state of the engine is stopped, step S306 is executed. When the current state of the engine is operating, step S312 is executed.

Step S306, a start power limit of the engine is determined according to the temperature of the engine coolant, the current vehicle speed, the actual SOC value of the battery and the target SOC value of the battery.

Step S308, whether the driver demand power is greater than the start power limit is determined. If so, step S310 is executed, otherwise, this process ends.

Step S310, it is determined that the driver demand power related start occurs. Step S318 is then executed.

Step S312, a stop power limit of the engine is determined according to the current vehicle speed, the actual SOC value of the battery and the target SOC value of the battery.

Step S314, whether the driver demand power is less than the stop power limit is determined. If so, step S316 is executed, otherwise, this process ends.

Step S316, it is determined that the driver demand power related stop occurs. Step S318 is then executed.

Step S318, a level of the engine start-stop related event is determined.

In Embodiment 1, the engine start-stop related event is specifically the driver demand power related start or the driver demand power related stop, the level of which is the second level.

Step S320, when it is determined that the driver demand power related start occurs, the engine is requested and controlled to start.

Step S322, when it is determined that the driver demand power related stop occurs, the engine is requested and controlled to stop.

The power related start-stop in this embodiment is the most commonly used start-stop mode in fuel consumption cycle conditions and actual driving. The specific set limits used (such as the start power limit and the stop power limit) need to be calibrated according to the specific targets of drivability, emissions, fuel consumption, and energy balance of the vehicle.

In step S306 above, the start power limit may be determined by looking up a table. Specifically, when the temperature of the engine coolant is lower than or equal to a set temperature value (for example, 40° C.), the start power limit of the engine is determined from the vehicle speed and the SOC of the battery by looking up a first start power limit relation table. Table 1 below is an exemplary first start power limit relation table in a cold engine state.

TABLE 1

First start power limit relation table

| | x | | | | | | |
|---|---|---|---|---|---|---|---|
| y | 10 | 33 | 34 | 52 | 53 | 62 | 63 |
| 10 | 32 | 24 | 24 | 24 | 6.6 | 6.6 | 3.5 |
| 16.9 | 32 | 24 | 24 | 24 | 6.6 | 6.6 | 3.5 |
| 17 | 32 | 24 | 11 | 11 | 6.6 | 6.6 | 3.5 |
| 22 | 32 | 24 | 11 | 11 | 6.6 | 6.6 | 3.5 |
| 23 | 32 | 7 | 7 | 6 | 6 | 6 | 3.5 |
| 25 | 32 | 7 | 7 | 6 | 6 | 6 | 3.5 |

In Table 1, x represents the vehicle speed (in km/h), y represents a difference between the target SOC value and the actual SOC value of the battery (in %), and the unit of the start power limit is kW. The setting principle of each power limit in the first start power limit relation table is: the start is not easy at a high SOC, but easy at a low SOC; and the start is not easy at a low vehicle speed, but easy at a high vehicle speed.

When the temperature of the engine coolant is higher than the set temperature value (i.e., warm and hot engine states), the start power limit of the engine is determined from the vehicle speed and the SOC of the battery by looking up a second start power limit relation table. Table 2 below is an exemplary second start power limit relation table.

TABLE 2

Second start power limit relation table

| | x | | | | | | |
|---|---|---|---|---|---|---|---|
| y | 10 | 33 | 34 | 52 | 53 | 62 | 63 |
| 10 | 32 | 24 | 19 | 19 | 19 | 14.5 | 3.5 |
| 16.9 | 32 | 24 | 12 | 12 | 12 | 10.4 | 3.5 |
| 17 | 32 | 24 | 11 | 11 | 11 | 9.7 | 3.5 |
| 22 | 32 | 24 | 11 | 11 | 11 | 9.7 | 3.5 |
| 23 | 32 | 24 | 11 | 11 | 11 | 9.7 | 3.5 |
| 25 | 32 | 24 | 11 | 11 | 11 | 9.7 | 3.5 |

The meanings and units of x and y as well as the values in Table 2 are the same as those in Table 1. The NEDC and WLTC cycle curve characteristics need to be considered when the values in the second start power limit relation table are set, and the setting principle is: the start is not easy at a high SOC, but easy at a low SOC; and the start is not easy at a low vehicle speed, but easy at a high vehicle speed. In addition, the second start power limit relation table is different from the first start power limit relation table. Compared with a warm engine limit, the engine does not burn well in a cold state and at a low speed, so the power limit is greater and more pure electric driving is used.

In step S312 above, the stop power limit of the engine can be determined from the vehicle speed and the SOC of the battery by looking up a stop power limit relation table. Table 3 below is an exemplary stop power limit relation table.

TABLE 3

Stop power limit relation table

| | x | | | | | | |
|---|---|---|---|---|---|---|---|
| y | 14 | 16 | 33 | 44 | 60 | 80 | 100 |
| 5 | 0 | 0 | −2 | −4 | −9 | −10 | −11 |
| 9 | 0 | 0 | −2 | −4 | −9 | −10 | −11 |
| 10 | 0 | 0 | −2 | −4 | −9 | −10 | −11 |
| 15 | 0 | 0 | −2 | −4 | −9 | −10 | −11 |
| 23 | 0 | 0 | −2 | −4 | −9 | −10 | −11 |
| 24 | 0 | 0 | −2 | −4 | −9 | −10 | −11 |

The meanings and units of x and y as well as the values in Table 3 are the same as those in Table 1.

Embodiment 2

Embodiment 2 is an engine start-stop control method based on battery power balance related start-stop.

Figure 4:
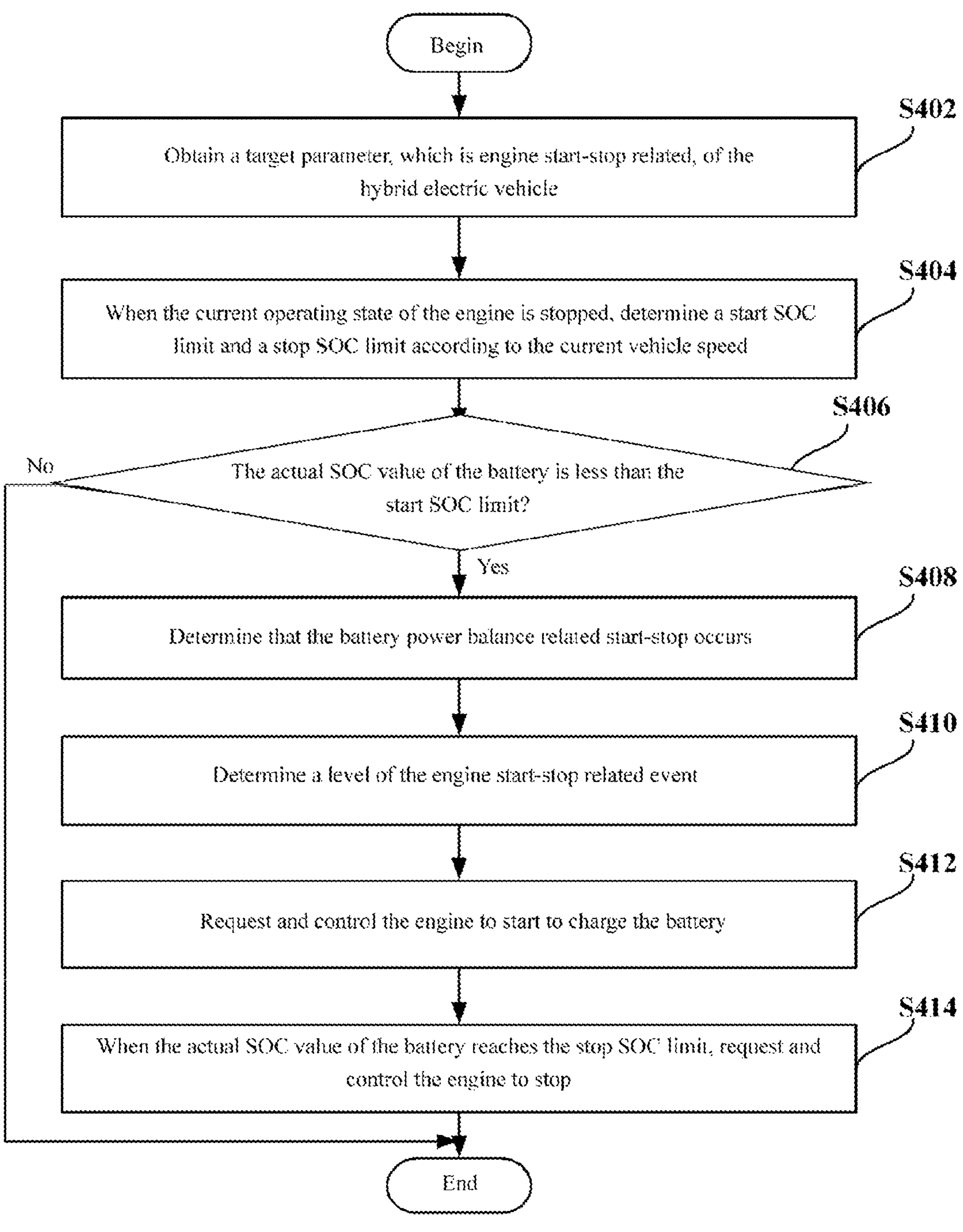
FIG. 4 is a schematic flowchart of an engine start-stop control method for a hybrid electric vehicle according to Embodiment 2 of the present invention.

Referring to FIG. 4, the engine start-stop control method of Embodiment 2 includes step S402 to step S414 below.

In step S402, a target parameter of the hybrid electric vehicle that is related to the start and stop of an engine are obtained. The target parameter specifically includes a current operating state of the engine, a current vehicle speed and an actual SOC value of the battery.

Step S404, when the current operating state of the engine is stopped, a start SOC limit and a stop SOC limit are determined according to the current vehicle speed.

Step S406, whether the actual SOC value of the battery is less than the start SOC limit is determined. If so, step S408 is executed, otherwise, this process ends.

Step S408, it is determined that the battery power balance related start-stop occurs.

Step S410, a level of the engine start-stop related event is determined.

In Embodiment 2, the engine start-stop related event is specifically the battery power balance related start-stop, the level of which is the second level.

Step S412, the engine is requested and controlled to start to charge the battery.

Step S414, when the actual SOC value of the battery reaches the stop SOC limit, the engine is requested and controlled to stop.

In this embodiment, in order to maintain battery power balance, the engine needs to be started for charging when the power drops to a certain offset below a target power value. The target charging power is adjusted with high and low loads and vehicle speeds. The target power may be, for example, 61% at a low load and 65% at a high low. The target SOC needs to be set to a higher value at a high vehicle speed to implement charging as much as possible at a higher engine efficiency, so as to ensure enough power to maintain the pure electric driving of the vehicle at a low speed.

Figure 5:
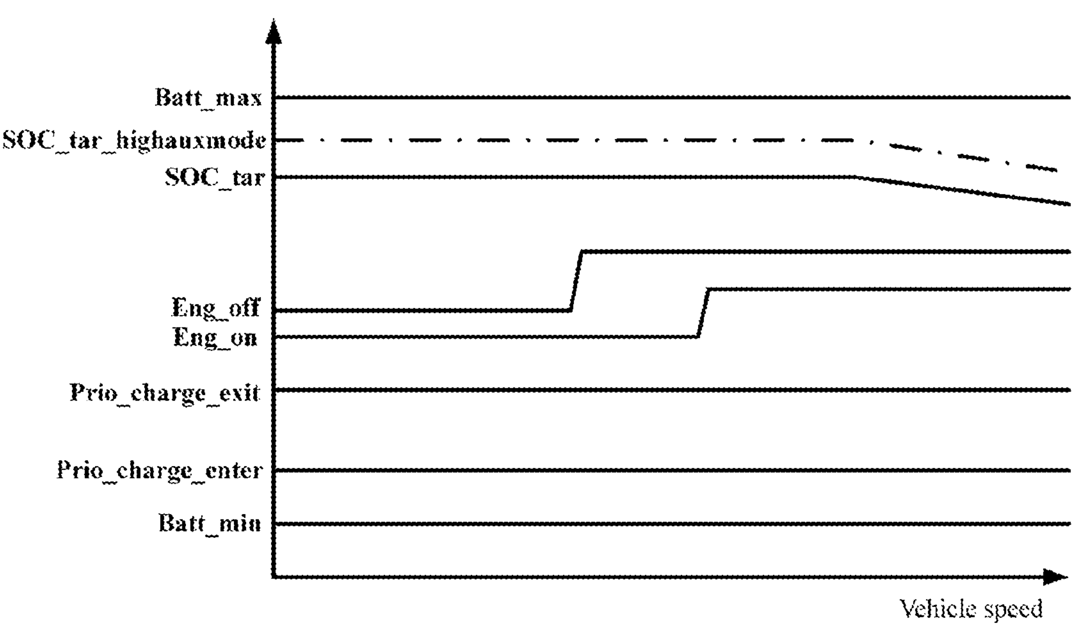
FIG. 5 is a battery power balance graph in Embodiment 2 of the present invention.

Specifically, in step S404 above, the start SOC limit and the stop SOC limit may be determined according to a preset battery power balance graph. FIG. 5 shows an exemplary battery power balance graph, in which the horizontal axis represents vehicle speeds, and the vertical axis represents SOC values. As shown in FIG. 5, Batt_max and Batt_min respectively represent an upper limit and a lower limit of SOC allowed by a battery controller, SOC_tar_high-auxmode represents a target SOC value under a high load, SOC_tar represents a target SOC value under a low load, Eng_off and Eng_on respectively represent the aforementioned stop SOC limit and start SOC limit, and Prio_charge_exit and Prio_charge_enter respectively represent a charging priority exit limit and a charging priority enter limit.

Further, after it is determined in step S408 that the battery power balance related start-stop occurs, whether the actual SOC value of the battery is less than a preset charging priority enter limit can also be determined. When it is determined that the actual SOC value of the battery is less than the preset charging priority enter limit, in step S412, after the engine is requested and controlled to start, the battery can be charged in a charging priority mode first until the actual SOC value of the battery reaches a preset charging priority exit limit, and then the battery is charged in a general charging mode until the actual SOC value of the battery reaches the stop SOC limit.

Embodiment 3

Embodiment 3 is an engine start-stop control method based on battery SOC protection related start-stop.

Figure 6:
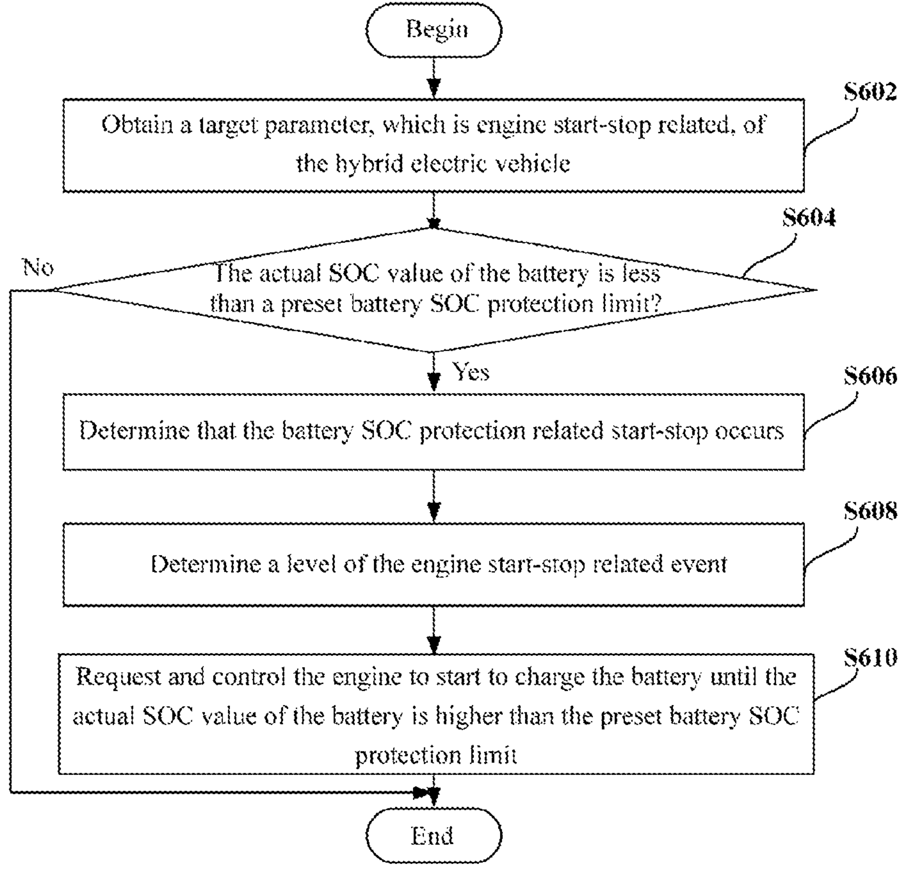
FIG. 6 is a schematic flowchart of an engine start-stop control method for a hybrid electric vehicle according to Embodiment 3 of the present invention.

Referring to FIG. 6, the engine start-stop control method of Embodiment 3 includes step S602 to step S610 below.

In step S602, a target parameter of the hybrid electric vehicle that is related to the start and stop of an engine are obtained. The target parameter specifically includes an actual SOC value of the battery.

Step S604, whether the actual SOC value of the battery is less than a preset battery SOC protection limit is determined, the battery SOC protection limit being a sum of a minimum SOC value allowable for the battery and a predetermined margin. If so, step S606 is executed, otherwise, this process ends.

Step S606, it is determined that the battery SOC protection related start-stop occurs.

Step S608, a level of the engine start-stop related event is determined.

In Embodiment 3, the engine start-stop related event is specifically the battery SOC protection related start-stop, the level of which is the second level.

Step S610, the engine is requested and controlled to start to charge the battery until the actual SOC value of the battery is higher than the preset battery SOC protection limit.

In this embodiment, an appropriate margin is reserved as a limit value on the basis of the minimum SOC allowable for the battery. When the actual SOC value of the battery is lower than the limit value (that is, the sum of the minimum SOC and the margin), the engine is requested to start, so as to effectively protect the battery.

Embodiment 4

Embodiment 4 is an engine start-stop control method based on battery available discharge power related start-stop.

Figures 7, 8:
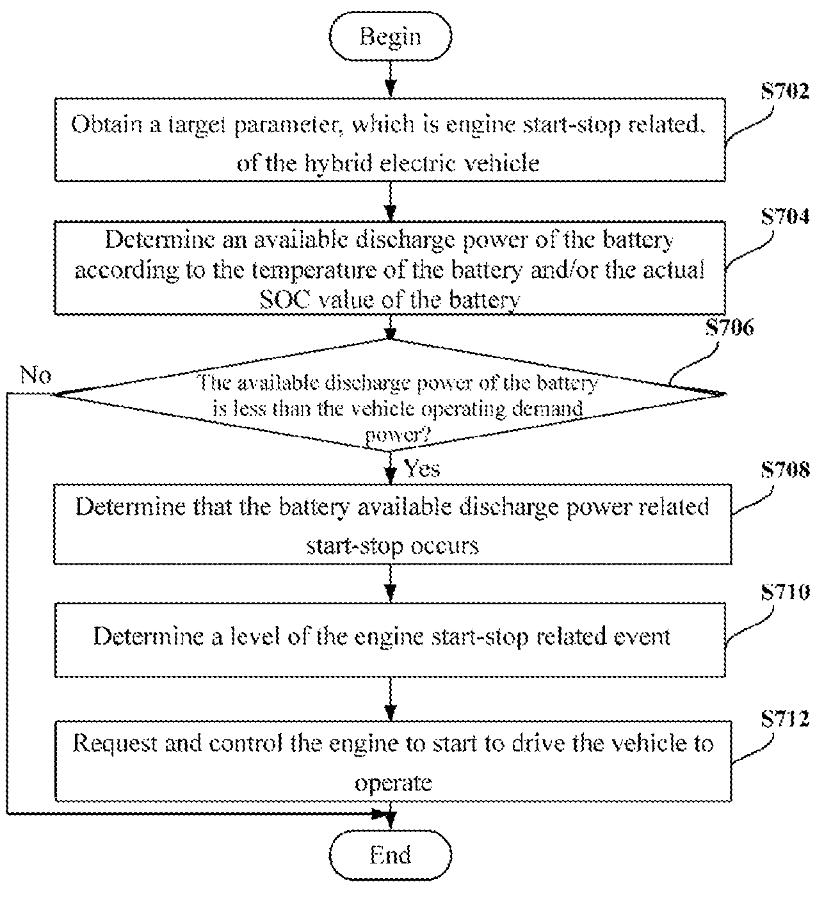
FIG. 7 is a schematic flowchart of an engine start-stop control method for a hybrid electric vehicle according to Embodiment 4 of the present invention.
FIG. 8 is a schematic flowchart of an engine start-stop control method for a hybrid electric vehicle according to Embodiment 5 of the present invention.

Referring to FIG. 7, the engine start-stop control method of Embodiment 4 includes step S702 to step S712 below.

In step S702, a target parameter of the hybrid electric vehicle that is related to the start and stop of an engine are obtained. The target parameter specifically includes a temperature of the battery and/or an actual SOC value of the battery, and a vehicle operating demand power.

Step S704, an available discharge power of the battery is determined according to the temperature of the battery and/or the actual SOC value of the battery.

Step S706, whether the available discharge power of the battery is less than the vehicle operating demand power is determined. If so, step S708 is executed, otherwise, this process ends.

Step S708, it is determined that the battery available discharge power related start-stop occurs.

Step S710, a level of the engine start-stop related event is determined.

In Embodiment 4, the engine start-stop related event is specifically the battery available discharge power related start-stop, the level of which is the second level.

Step S712, the engine is requested and controlled to start to drive the vehicle to operate.

When the temperature of the battery is too high or too low, and the SOC of the battery is too low, the discharge power of the battery will be limited. In this embodiment, the available discharge power of the battery is determined according to the temperature of the battery and/or the actual SOC value of the battery. When the available discharge power of the battery is insufficient to drive the normal operation of the vehicle, the engine is started to drive the vehicle, so as to meet the vehicle operation requirements. The available discharge power of the battery may be determined by an existing way according to the temperature of the battery and/or the actual SOC value of the battery.

2. Driving Behavior Related Start-Stop Events

The driving behavior related start-stop events are mainly related to driver's operating behaviors. When a driver performs some operations, such as selecting a power mode, high-throttle acceleration, etc., the control system thinks the driver needs sufficient power, and then requests the engine to start to achieve the driver's intention. Specifically, the driving behavior related start-stop event may include at least one of the following: power mode or manual mode activation, in-situ P/N gear high-throttle start, kickdown trigger, D/R gear high-throttle acceleration, and too high vehicle speed in a pure electric mode. Considering that the driving behavior related start-stop events are all related to meeting driver's power demands, the level of each driving behavior related start-stop event is the second level.

The engine start-stop control methods under various driving behavior related start-stop events are specifically described below in conjunction with Embodiment 5 to Embodiment 9.

Embodiment 5

Embodiment 5 is an engine start-stop control method based on power mode or manual mode activation.

Referring to FIG. 8, the engine start-stop control method of Embodiment 5 includes step S802 to step S808 below.

In step S802, a target parameter of the hybrid electric vehicle that is related to the start and stop of an engine are obtained. The target parameter specifically includes a current operating mode of the vehicle.

Step S804, when the current operating mode of the vehicle is a power mode or a manual mode, it is determined that the power mode or manual mode activation occurs.

Step S806, a level of the engine start-stop related event is determined.

In Embodiment 5, the engine start-stop related event is specifically the power mode or manual mode activation, the level of which is the second level.

Step S808, the engine is requested and controlled to start.

In this embodiment, when the driver selects the Power driving mode or puts a gear lever in the manual mode, the engine is requested to start, so as to respond to driver's demand in time and improve user's driving experience.

Embodiment 6

Embodiment 6 is an engine start-stop control method based on in-situ P/N gear high-throttle start.

Figure 9:
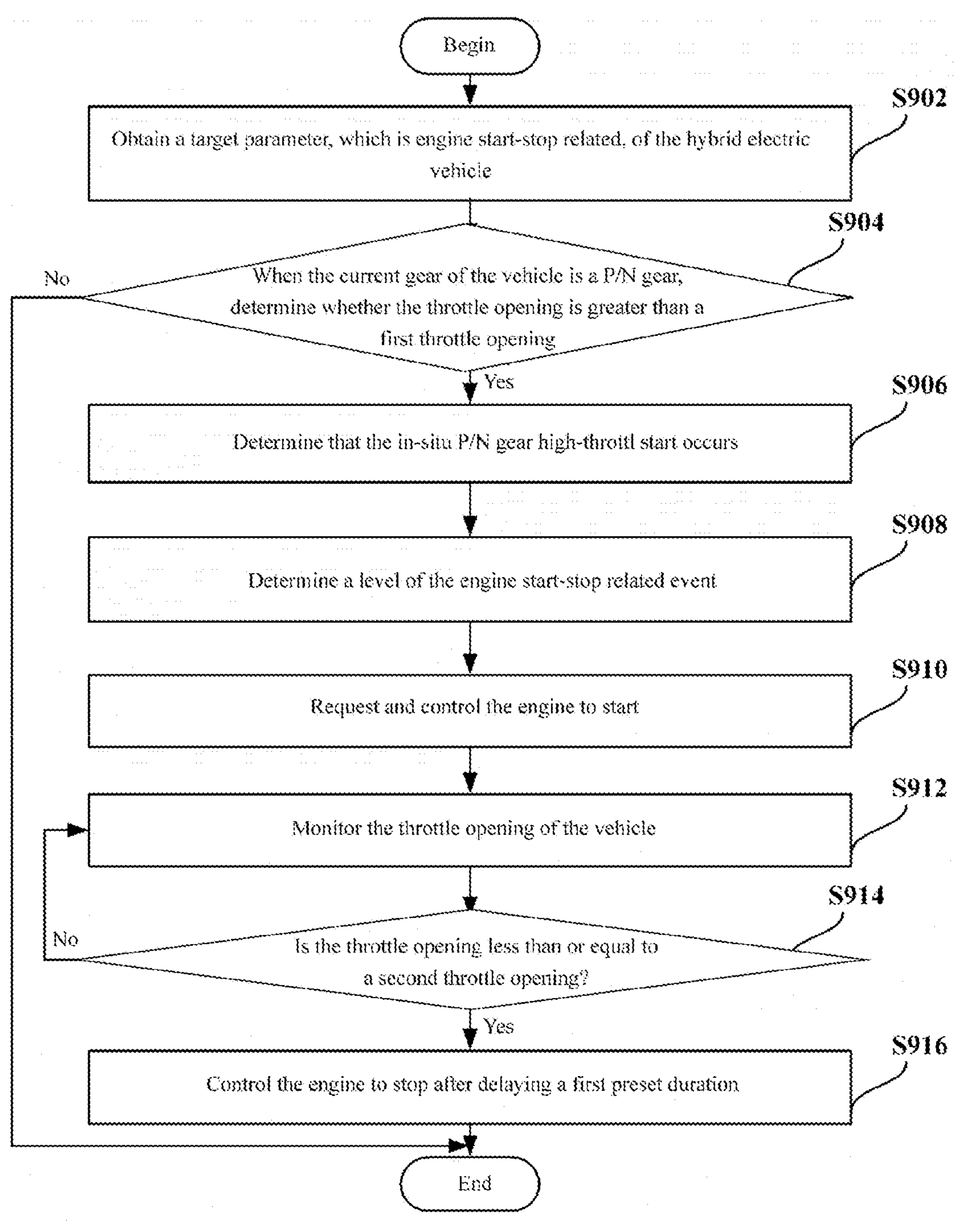
FIG. 9 is a schematic flowchart of an engine start-stop control method for a hybrid electric vehicle according to Embodiment 6 of the present invention.

Referring to FIG. 9, the engine start-stop control method of Embodiment 6 includes step S902 to step S916 below.

In step S902, a target parameter of the hybrid electric vehicle that is related to the start and stop of an engine are obtained. The target parameter specifically includes a current gear position and a throttle opening of the vehicle.

Step S904, when the current gear of the vehicle is a P/N gear, whether the throttle opening is greater than a first throttle opening is determined. If so, step S906 is executed, otherwise, this process ends.

The first throttle opening may be set according to empirical values, for example, may be set to 60%.

Step S906, it is determined that the in-situ P/N gear high-throttle start occurs.

Step S908, a level of the engine start-stop related event is determined.

In Embodiment 6, the engine start-stop related event is specifically the in-situ P/N gear high-throttle start, the level of which is the second level.

Step S910, the engine is requested and controlled to start.

Step S912, the throttle opening of the vehicle is monitored.

Step S914, whether the throttle opening is less than or equal to a second throttle opening is determined. If so, step S916 is executed, otherwise, step S912 is executed. The second throttle opening is less than the first throttle opening.

Step S916, the engine is controlled to stop after delaying a first preset duration. The first preset duration may be set according to actual application requirements, for example, set to 2 S.

In this embodiment, the engine is started under the condition of in-situ P/N gear high-throttle start to meet driver's driving experience, and when the throttle opening drops to the second throttle opening after the engine is started, the first preset duration is delayed and then the engine is controlled to stop, so as to prevent poor driving experience caused by the fact that the engine is immediately stopped as soon as the driver releases the throttle.

Embodiment 7

Embodiment 7 is an engine start-stop control method based on kickdown trigger.

Figure 10:
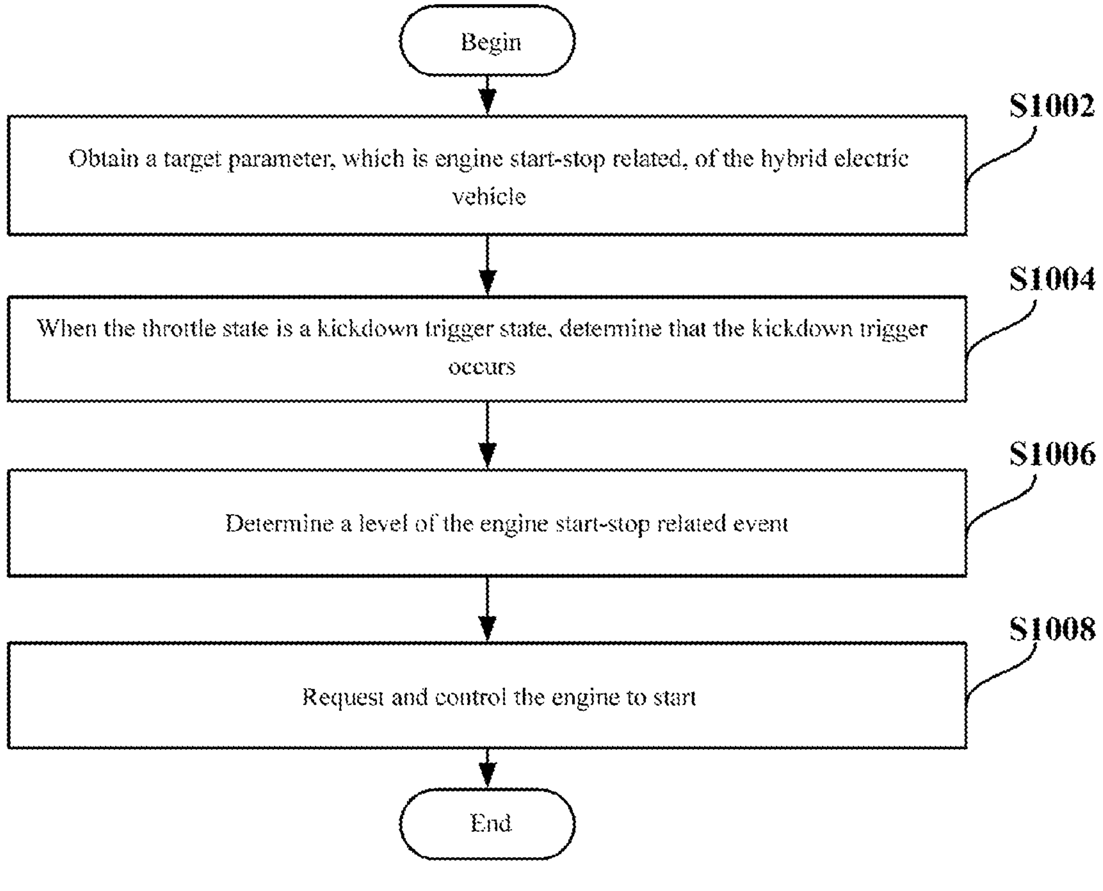
FIG. 10 is a schematic flowchart of an engine start-stop control method for a hybrid electric vehicle according to Embodiment 7 of the present invention.

Referring to FIG. 10, the engine start-stop control method of Embodiment 7 includes step S1002 to step S1008 below.

In step S1002, a target parameter of the hybrid electric vehicle that is related to the start and stop of an engine are obtained. The target parameter specifically includes a throttle state.

Step S1004, when the throttle state is a kickdown trigger state, it is determined that the kickdown trigger occurs.

Step S1006, a level of the engine start-stop related event is determined.

In Embodiment 7, the engine start-stop related event is specifically the kickdown trigger, the level of which is the second level.

Step S1008, the engine is requested and controlled to start.

Kickdown is an action of quickly pressing a throttle pedal to the bottom. In this embodiment, when Kickdown is triggered, it is considered that the driver needs power, and the engine is started at this time to meet driver's requirement.

Embodiment 8

Embodiment 8 is an engine start-stop control method based on D/R gear high-throttle acceleration. Specifically, D/R gear high-throttle acceleration may include D/R gear high-throttle acceleration start and D/R gear high-throttle acceleration stop.

Figure 11:
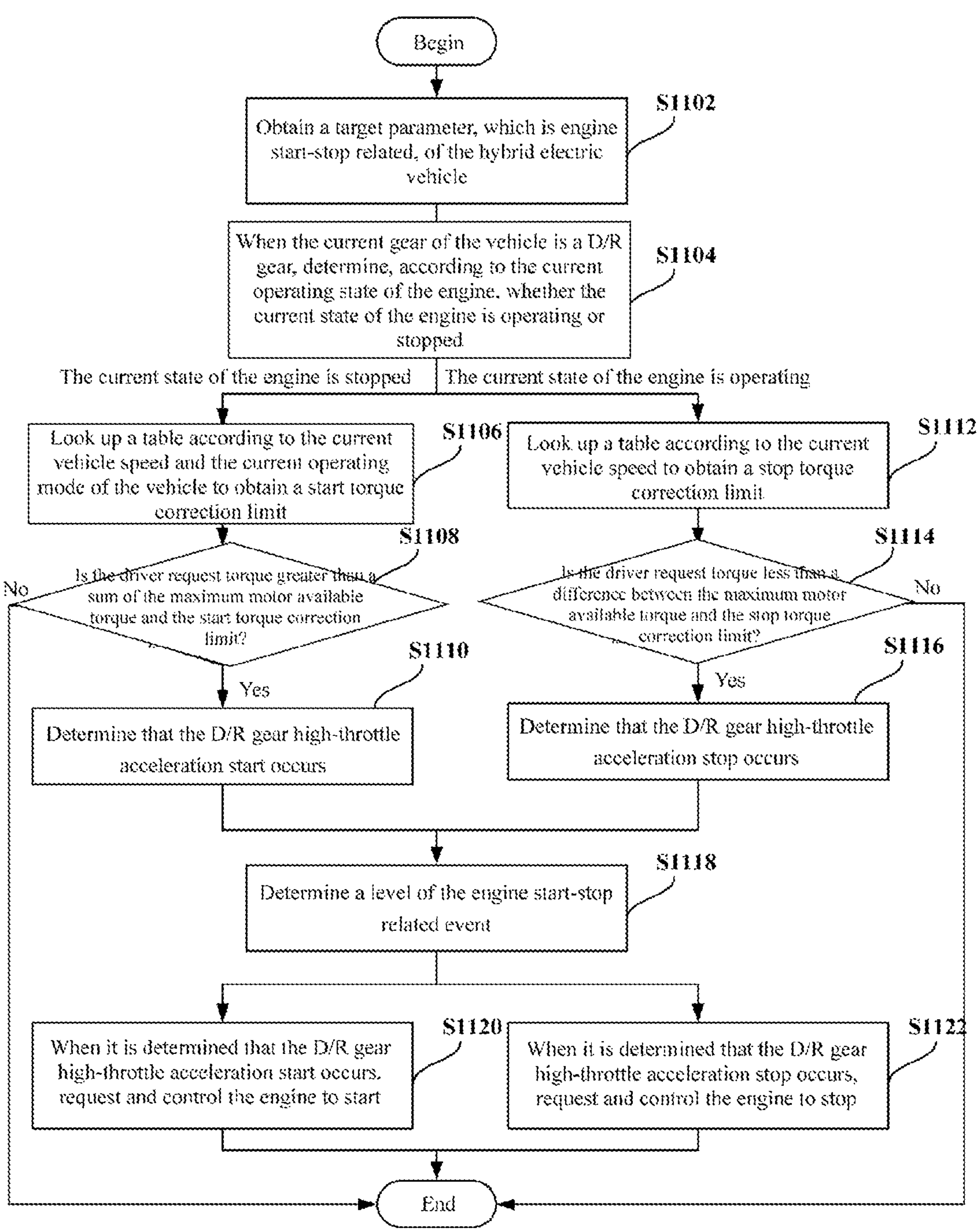
FIG. 11 is a schematic flowchart of an engine start-stop control method for a hybrid electric vehicle according to Embodiment 8 of the present invention.

Referring to FIG. 11, the engine start-stop control method of Embodiment 8 includes step S1102 to step S1122 below.

In step S1102, a target parameter of the hybrid electric vehicle that is related to the start and stop of an engine are obtained. The target parameter specifically includes a current gear of the vehicle, a current operating mode of the vehicle, a driver request torque, a maximum motor available torque, a current operating state of the engine, and a current vehicle speed.

Step S1104, when the current gear of the vehicle is a D/R gear, whether the current state of the engine is operating or stopped is determined according to the current operating state of the engine. When the current state of the engine is stopped, step S1106 is executed. When the current state of the engine is operating, step S1112 is executed.

Step S1106, a start torque correction limit is obtained by looking up a table according to the current vehicle speed and the current operating mode of the vehicle.

Step S1108, whether the driver request torque is greater than a sum of the maximum motor available torque and the start torque correction limit is determined. If so, step S1110 is executed, otherwise, this process ends.

Step S1110, it is determined that the D/R gear high-throttle acceleration start occurs. Step S1118 is then executed.

Step S1112, a stop torque correction limit is obtained by looking up a table according to the current vehicle speed.

Step S1114, whether the driver request torque is less than a difference between the maximum motor available torque and the stop torque correction limit is determined. If so, step S1116 is executed, otherwise, this process ends.

Step S1116, it is determined that the D/R gear high-throttle acceleration stop occurs. Step S1118 is then executed.

Step S1118, a level of the engine start-stop related event is determined.

In Embodiment 8, the engine start-stop related event is specifically the D/R gear high-throttle acceleration start or the D/R gear high-throttle acceleration stop, the level of which is the second level.

Step S1120, when it is determined that the D/R gear high-throttle acceleration start occurs, the engine is requested and controlled to start.

Step S1122, when it is determined that the D/R gear high-throttle acceleration stop occurs, the engine is requested and controlled to stop.

In this embodiment, when the driver steps to a large throttle opening at the D/R gear and the motor torque cannot meet the driver's torque request, the engine will be started to ensure power performance. This function should be calibrated according to a pedal map. Meanwhile, due to different battery capacity under different environment temperatures, a calibration limit needs to be corrected. This function is unrelated to the SOC of the battery, but is only performed according to the driver's intention, which is fundamentally different from the power start in energy management. In addition, different vehicle operating modes (i.e. driving modes) correspond to different torque correction limit tables, and influencing factors such as fuel consumption and emissions also need to be considered during the actual calibration process to avoid mutual interference, so that the engine start-stop control is more accurate and effective.

In step S1106 above, the start torque correction limit may be obtained by looking up a start torque correction limit relation table according to the current vehicle speed and the current operating mode of the vehicle. Specifically, when the current operating mode of the vehicle is a normal mode (other modes except an economical mode), a first start torque correction limit relation table is looked up. Table 4 below is an exemplary first start torque correction limit relation table in the normal mode.

TABLE 4

| First start torque correction limit relation table | | | | | | |
|---|---|---|---|---|---|---|
| Vehicle speed | 3 | 10 | 20 | 30 | 50 | 100 |
| Start torque correction limit | 1500 | 600 | 235 | 200 | 150 | 100 |

When the current operating mode of the vehicle is an economical mode, a second start torque correction limit relation table is looked up. Table 5 below is an exemplary second start torque correction limit relation table in the economical mode.

TABLE 5

| Second start torque correction limit relation table | | | | | | |
|---|---|---|---|---|---|---|
| Vehicle speed | 3 | 10 | 20 | 30 | 50 | 100 |
| Start torque correction limit | 1500 | 1300 | 1200 | 900 | 700 | 550 |

Comparing Table 4 with Table 5, it can be seen that, in the economical mode, the start torque correction limit is larger, the start is more difficult, and the vehicle is mostly driven by a motor.

In step S1112 above, the stop torque correction limit may be obtained by looking up a stop torque correction limit relation table according to the current vehicle speed. Table 6 below is an exemplary stop torque correction limit relation table.

TABLE 6

| Stop torque correction limit relation table | | | | | | |
|---|---|---|---|---|---|---|
| Vehicle speed | 0 | 15 | 20 | 30 | 45 | 70 |
| Stop torque correction limit | 1257 | 1257 | 777 | 410 | 450 | 350 |

The unit of the vehicle speed in Table 4 to Table 6 above is km/h, and the unit of the start torque correction limit and the stop torque correction limit is N·m.

Embodiment 9

Embodiment 9 is an engine start-stop control method based on a too high vehicle speed in a pure electric mode.

Figures 12, 13:
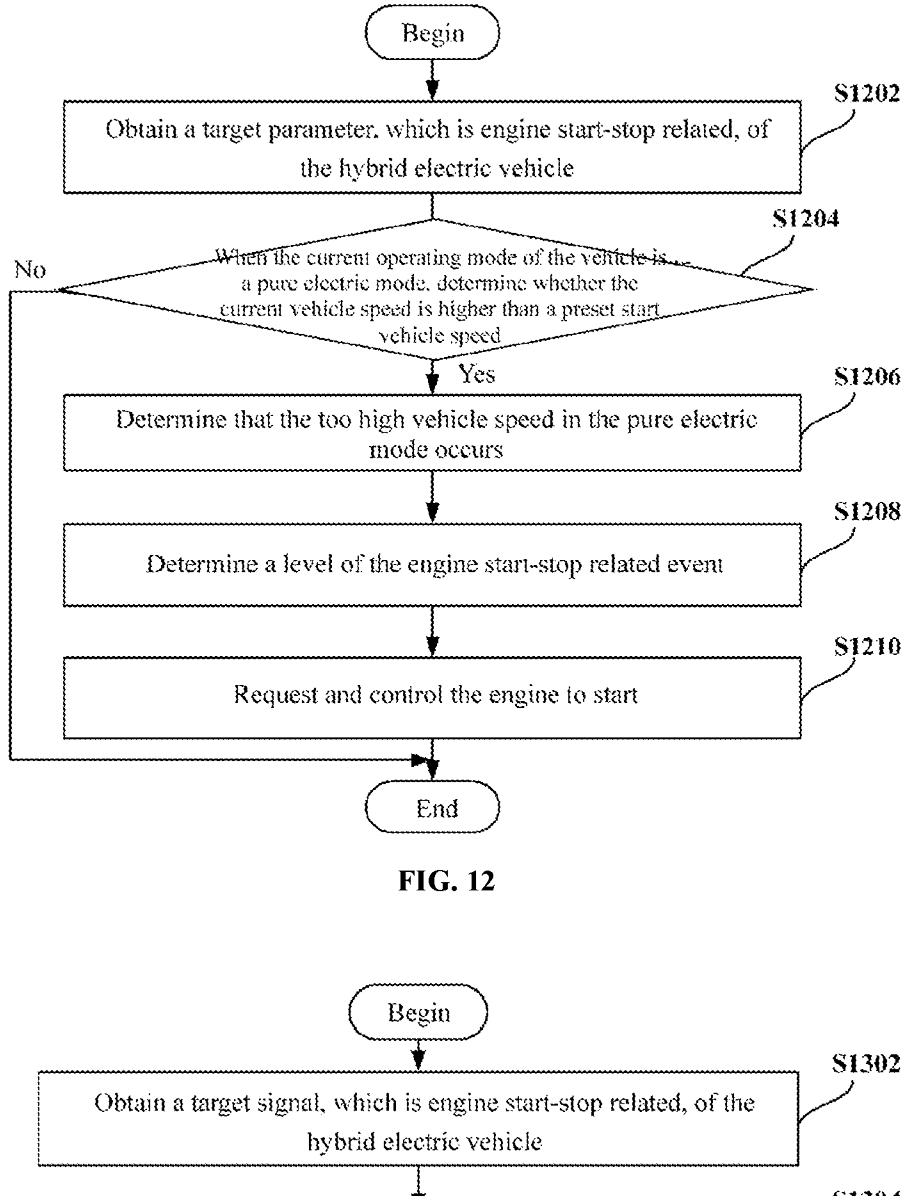
FIG. 12 is a schematic flowchart of an engine start-stop control method for a hybrid electric vehicle according to Embodiment 9 of the present invention.
FIG. 13 is a schematic flowchart of an engine start-stop control method for a hybrid electric vehicle according to Embodiment 11 of the present invention.

Referring to FIG. 12, the engine start-stop control method of Embodiment 9 includes step S1202 to step S1210 below.

In step S1202, a target parameter of the hybrid electric vehicle that is related to the start and stop of an engine are obtained. The target parameter specifically includes a current operating mode of the vehicle and a current vehicle speed.

Step S1204, when the current operating mode of the vehicle is a pure electric mode, whether the current vehicle speed is higher than a preset start vehicle speed is determined. If so, step S1206 is executed, otherwise, this process ends.

Step S1206, it is determined that the too high vehicle speed in the pure electric mode occurs.

Step S1208, a level of the engine start-stop related event is determined.

In Embodiment 9, the engine start-stop related event is specifically the too high vehicle speed in the pure electric mode, the level of which is the second level.

Step S1210, the engine is requested and controlled to start.

When the speed of the hybrid electric vehicle is higher than a certain value, the capacity of the motor is no longer sufficient to maintain normal acceleration or driving. Therefore, in this embodiment, when the vehicle speed in the pure electric mode is higher than the preset start vehicle speed, the engine is requested to start and operate to provide power, so as to ensure the normal acceleration and driving of the vehicle.

When the start vehicle speed is set, it should be distinguished whether the vehicle is a Plug-in Hybrid Electric Vehicle (PHEV) or a Hybrid Electric Vehicle (HEV). For the PHEV, in order to ensure enough endurance mileage during the legal New European Driving Cycle (NEDC) endurance mileage test, the start vehicle speed should be higher than a maximum vehicle speed in the NEDC, but not too much, otherwise the drivability will be affected. Optionally, the start vehicle speed may be a sum of the maximum vehicle speed in the NEDC and an incremental value, and the incremental value may be an empirical value, for example, may be equal to 10 km/h. For the HEV, because there is no demand for pure electric endurance mileage, the start limit is calibrated according to a project input.

3. Engine State Related Start-Stop Events

The engine state related start-stop event is mainly start related to engine hardware. The engine start-stop control method based on the engine state related start-stop event is described below through Embodiment 10.

Embodiment 10

Embodiment 10 is an engine start-stop control method based on an engine state related start-stop event.

In this embodiment, the engine state related start-stop event may include at least one of the following at least 13 events. The determination condition and level of each event and the corresponding start-stop control measure are described below.

(1) Insufficient Oxygen Storage Capacity of a Catalytic Converter

When fuel cutoff occurs or an air-fuel ratio (also referred to as a lambda value) is less than a preset ratio, it is determined that the oxygen storage capacity of the catalytic converter is insufficient. In this case, in order to retain oxygen ions stored in the catalytic converter and prevent excessive NOx, the engine is requested to start. Therefore, the level of insufficient oxygen storage capacity of the catalytic converter can be set as the second level. Correspondingly, after it is determined that the oxygen storage capacity of the catalytic converter is insufficient, the engine is requested and controlled to start.

(2) Too High Temperature of the Catalytic Converter

When the temperature of the catalytic converter is greater than a first temperature threshold, it is determined that the temperature of the catalytic converter is too high. At this time, from the perspective of exhaust temperature protection, the engine needs to be kept in operation for cooling. Therefore, the level of too high temperature of the catalytic converter can be set as the first level. Correspondingly, after it is determined that the temperature of the catalytic converter is too high, the engine is kept in operation under the condition that the engine has operated.

(3) Too High Environment Temperature

When the environment temperature of the vehicle is greater than a second temperature threshold, it is determined that the environment temperature is too high. At this time, the engine is requested to start to enable a water circulation for cooling. Therefore, the level of too high environment temperature can be set as the second level. Correspondingly, after it is determined that the environment temperature is too high, the engine is requested and controlled to start. The second temperature threshold may be set according to actual application requirements, for example, may be set to 50° C.

(4) Too High Temperature of Engine Coolant

When the temperature of the engine coolant (usually a water temperature) is greater than a third temperature threshold, it is determined that the temperature of the engine coolant is too high. At this time, if the engine is operating, the engine needs to be kept in operation in order to maintain the temperature of the engine coolant in a suitable temperature range. Therefore, the level of too high temperature of the engine coolant can be set as the first level. Correspondingly, after it is determined that the temperature of the engine coolant is too high, the engine is kept in operation under the condition that the engine has operated. The third temperature threshold may be set according to actual application requirements, for example, may be set to 107° C.

(5) Too Low Temperature of the Engine Coolant

When the temperature of the engine coolant is less than a fourth temperature threshold, it is determined that the temperature of the engine coolant is too low. Because the emissions of the engine are poor when the engine starts at low temperature of the engine coolant, in order to avoid emission deterioration caused by frequent start and stop, when the temperature of the engine coolant is lower than the threshold, the engine is requested to start to increase the temperature of the coolant. Therefore, the level of too low temperature of the engine coolant can be set as the second level. Correspondingly, after it is determined that the temperature of the engine coolant is too low, the engine is requested and controlled to start, and after the engine is started, the engine is kept in operation until the temperature of the engine coolant reaches a target temperature threshold. The fourth temperature threshold and the target temperature threshold may be set according to actual application requirements. For example, the fourth temperature threshold may be set to −4° C., and the target temperature threshold may be set to 10° C.

(6) Too High Pre-Turbine Temperature of a Supercharger

When the pre-turbine temperature of the supercharger is greater than a fifth temperature threshold, it is determined that the pre-turbine temperature of the supercharger is too high. At this time, the operation of the engine needs to be maintained in order to avoid a sudden stop under high-speed enrichment conditions, causing a large amount of air to enter the exhaust system, which may further cause damage to the catalytic converter or supercharger. Therefore, the level of too high pre-turbine temperature of the supercharger can be set as the first level. Correspondingly, after it is determined that the pre-turbine temperature of the supercharger is too high, the engine is kept in operation under the condition that the engine has operated.

(7) Too High Temperature of Engine Oil

When the temperature of engine oil is greater than a sixth temperature threshold, it is determined that the temperature of the engine oil is too high. At this time, the engine needs to be kept in operation to increase oil agitation to induce oil cooling. Therefore, the level of too high temperature of the engine oil can be set as the first level. Correspondingly, after it is determined that the temperature of the engine oil is too high, the engine is kept in operation under the condition that the engine has operated.

(8) Too Large Load of a Canister

When the load of the canister is greater than a preset load, it is determined that the load of the canister is too large. At this time, the engine needs to be kept in operation to flush the canister. Therefore, the level of too large load of the canister can be set as the first level. Correspondingly, after it is determined that the load of the canister is too large, the engine is kept in operation under the condition that the engine has operated.

(9) Over-Limit Cumulative Stop Time of the Engine

When the cumulative stop time of the engine in a driving cycle is greater than a preset stop time threshold, it is determined that the cumulative stop time of the engine is over-limit. At this time, there may be excessive deposits in the canister, and the engine needs to be started to flush the canister. Therefore, the level of over-limit cumulative stop time of the engine can be set as the second level. Correspondingly, after it is determined that the cumulative stop time of the engine is over-limit, the engine is requested and controlled to start, and the canister is flushed after the engine is started.

(10) Engine Oil Dilution

When the fuel that is not completely burnt is mixed into the engine oil, the engine oil will be diluted, causing reduction of the viscosity of the engine oil, thereby reducing the anti-wear property of the engine oil and causing insufficient engine lubrication. When the viscosity of the engine oil is less than a preset viscosity value, it is determined that the engine oil is diluted. At this time, in order to prevent frequent start of the engine for enrichment of the engine oil, the start and stop of the engine need to be prohibited, and the engine is kept in operation. Therefore, the level of the engine oil dilution can be set as the first level. Correspondingly, after it is determined that the engine oil is diluted, the engine is kept in operation under the condition that the engine has operated.

(11) Heating of the Catalytic Converter

When the catalytic converter satisfies a heating condition and the engine has started, it is determined that catalytic converter is heated. At this time, in order to ensure that the temperature of the catalytic converter quickly reaches an appropriate working temperature, the engine needs to be kept in operation until the heating of the catalytic converter ends. Therefore, the level of heating of the catalytic converter can be set as the first level. Correspondingly, after it is determined that the catalytic converter is heated, under the condition that the engine has operated, the engine is kept in operation until the heating of the catalytic converter ends.

(12) Closed-Loop Diagnosis of an Oxygen Sensor

When the oxygen sensor has a demand for closed-loop diagnosis, it is determined that the oxygen sensor is subjected to closed-loop diagnosis. At this time, in order to ensure the smooth completion of the closed-loop diagnosis, the engine needs to be kept in operation. Therefore, the level of closed-loop diagnosis of the oxygen sensor can be set as the first level. Correspondingly, after it is determined that the oxygen sensor is subjected to closed-loop diagnosis, under the condition that the engine has operated, the engine is kept in operation until the closed-loop diagnosis is completed.

(13) Aging of Fuel

When a fuel age of the engine is greater than a fuel age threshold, it is determined that the fuel is aged. The fuel age refers to the number of days that the fuel has been in a fuel tank since refueling without being used. The fuel age threshold is obtained by looking up a fuel age threshold and coolant temperature relation table according to the current temperature of the engine coolant. Table 7 below is an exemplary fuel age threshold and coolant temperature relation table.

TABLE 7

Fuel age threshold and coolant temperature relation table

| | Current temperature of coolant/° C. | | | | | | | | | | | |
|---|---|---|---|---|---|---|---|---|---|---|---|---|
| | −40 | −30 | −20 | −10 | 0 | 10 | 20 | 30 | 40 | 50 | 60 | 70 |
| Fuel age/days | 80 | 80 | 100 | 120 | 160 | 200 | 260 | 320 | 380 | 380 | 380 | 380 |

4. External Controller Request Start-Stop Events

The external controller request start-stop event mainly considers start requests of controllers (such as an air conditioner controller) outside the power system. Specifically, the external controller request start-stop event may include at least one of the following: air conditioner controller request start and driver leaving request start. Considering that the external controller request start-stop events are all related to user experience, the level of each external controller request start-stop event is the second level.

The engine start-stop control methods under various external controller request start-stop events are specifically described below in conjunction with Embodiment 11 and Embodiment 12.

Embodiment 11

Embodiment 11 is an engine start-stop control method based on air conditioner controller request start.

Referring to FIG. 13, the engine start-stop control method of Embodiment 11 includes step S1302 to step S1308 below.

Step S1302, a target signal, which is engine start-stop related, of the hybrid electric vehicle is obtained. The target signal specifically includes a start request signal of an air conditioner controller.

Step S1304, when the start request signal of the air conditioner controller is received, it is determined that the air conditioner controller request start occurs.

Step S1306, a level of the engine start-stop related event is determined.

In Embodiment 11, the engine start-stop related event is specifically the air conditioner controller request start, the level of which is the second level.

Step S1308, the engine is requested and controlled to start.

In this embodiment, the engine is started when the start request signal of the air conditioner controller is received. When the temperature in the vehicle is relatively low in winter, the engine is started in response to a start request of the air conditioner controller, which can meet the heating demand in the vehicle in a low temperature environment and improve the user experience.

Embodiment 12

Embodiment 12 is an engine start-stop control method based on driver leaving request start.

Figure 14:
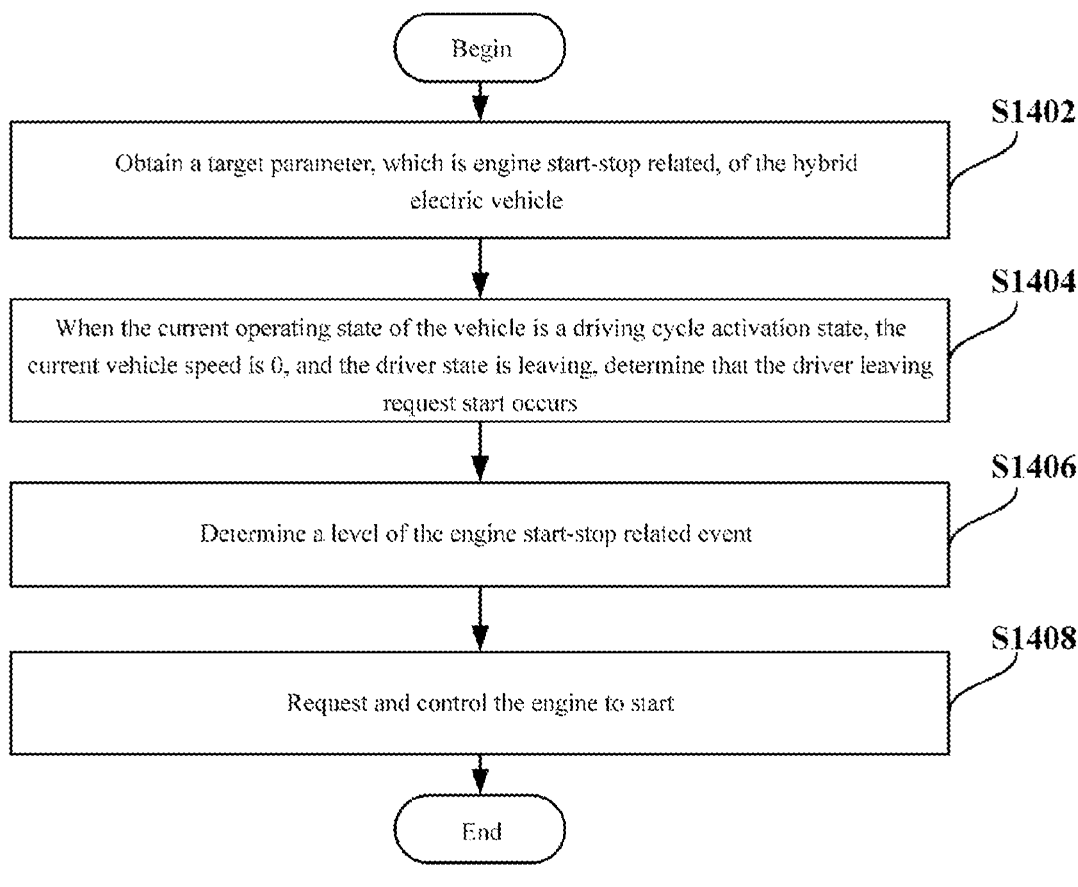
FIG. 14 is a schematic flowchart of an engine start-stop control method for a hybrid electric vehicle according to Embodiment 12 of the present invention.

Referring to FIG. 14, the engine start-stop control method of Embodiment 12 includes step S1402 to step S1408 below.

In step S1402, a target parameter of the hybrid electric vehicle that is related to the start and stop of an engine are obtained. The target parameter specifically includes a current operating state of the vehicle, a current vehicle speed and a driver state.

Step S1404, when the current operating state of the vehicle is a driving cycle activation state, the current vehicle speed is 0, and the driver state is leaving, it is determined that the driver leaving request start occurs.

Step S1406, a level of the engine start-stop related event is determined.

In Embodiment 12, the engine start-stop related event is specifically the driver leaving request start, the level of which is the second level.

Step S1408, the engine is requested and controlled to start.

In this embodiment, when the current operating state of the vehicle is the driving cycle activation state, the current vehicle speed is 0, and the driver state is leaving, a vehicle electronic controller will request the engine to start to remind the driver that the vehicle is not powered off.

5. Other Condition Related Start-Stop Events

The engine start-stop control method based on other condition related start-stop events is described below through Embodiment 13.

Embodiment 13

Embodiment 13 is an engine start-stop control method based on other condition related start-stop events.

In this embodiment, the other condition related start-stop events may include at least one of the following at least 9 events. The determination condition and level of each event and the corresponding start-stop control measure are described below.

(1) Fan Control Related Start-Stop

When the engine has operated and a duty ratio of fan control is higher than a calibrated threshold, it is determined that the fan control related start-stop occurs. At this time, the engine needs to be kept in operation to reduce the duty ratio of fan control. Therefore, the level of the fan control related start-stop can be set as the first level. Correspondingly, after it is determined that the fan control related start-stop occurs, under the condition that the engine has operated, the engine is kept in operation until the duty ratio of fan control is lower than the calibrated threshold. The calibrated threshold may be set according to actual application requirements, for example, may be set to 60%.

(2) Factory Mode Request Start-Stop

When a factory mode of the vehicle is triggered, it is determined that the factory mode request start-stop occurs. Usually, when the vehicle is at a factory lower limit, the factory mode needs to be triggered to check the state of the engine. At this time, the engine is requested to start. Therefore, the level of the factory mode request start-stop can be set as the second level. Correspondingly, after it is determined that the factory mode request start-stop occurs, the engine is requested and controlled to start.

(3) Related Start-Stop after Vehicle Collision

After the vehicle collides, it is determined that the related start-stop after vehicle collision occurs. At this time, the engine needs to be started to avoid power loss. Therefore, the level of the related start-stop after vehicle collision can be set as the second level. Correspondingly, after it is determined that the related start-stop after vehicle collision occurs, the engine is requested and controlled to start.

(4) Remote Start Request Start-Stop

When a remote start request is received from the driver, it is determined that the remote start request start-stop occurs. The level of the remote start request start-stop can be set as the second level. Correspondingly, after it is determined that the remote start request start-stop occurs, the engine is requested and controlled to start, thereby realizing timely response to a user request and improving user experience.

(5) Minimum Operating Time Related Start-Stop

When the engine is being started or after the engine has been successfully started, it is determined that the minimum operating time related start-stop occurs. At this time, the engine is requested to operate for a certain period of time before being allowed to stop, so as to avoid start failure or frequent start and stop, which will affect the driving experience. Therefore, the level of the minimum operating time related start-stop can be set as the first level. Correspondingly, after it is determined that the minimum operating time related start-stop occurs, the engine is kept in operation for at least a second preset duration under the condition that the engine has operated. The second preset duration can be set according to actual application requirements, and cannot be set to be too long, otherwise the engine is likely to still operate during idling, which affects fuel consumption. For example, the second preset duration can be set to 4 s.

(6) Low Motor Available Torque

When a ratio of the available torque of the motor to the maximum torque of the motor is less than a preset ratio, it is determined that the low motor available torque occurs. In order to prevent power loss or slow power response, the engine is requested to start at this time. Therefore, the level of the low motor available torque can be set as the second level. Correspondingly, after it is determined that the low motor available torque occurs, the engine is requested and controlled to start. The preset ratio may be set according to actual application requirements, for example, may be set to 0.5.

(7) Start after Engine Start Failure

After the engine fails to start, it is determined that the start after engine start failure occurs. At this time, the start request needs to occur again in order to restart the engine. Therefore, the level of the start after engine start failure can be set as the second level. Correspondingly, after it is determined that the start after engine start failure occurs, the engine is requested and controlled to start again.

(8) Battery Failure Request Start

When the battery fails, it is determined that the battery failure request start occurs. When the battery fails, the engine is requested to start in order to avoid power loss. Therefore, the level of the battery failure request start can be set as the second level. Correspondingly, after it is determined that the battery failure request start occurs, the engine is requested and controlled to start.

(9) Motor Failure Request Start when the mode of the motor does not respond to a request, a torque output path of the motor does not respond to a request, or the mode of the motor is a failure mode, it is determined that the motor failure request start occurs. When the motor fails, the engine needs to be started for direct drive in order to avoid power loss. Therefore, the level of the motor failure request start can be set as the second level. Correspondingly, after it is determined that the motor failure request start occurs, the engine is requested and controlled to start.

The embodiments of the engine start-stop control methods under various engine start-stop related events are described above. In these embodiments, by specifically defining the determination condition and level of each engine start-stop related event, and defining a corresponding start-stop control measure for each different engine start-stop related event, it is ensured that the engine start-stop control can not only meet the driver's request, but also balance fuel consumption, protect the battery, and improve the comfort of passengers in winter.

Figure 15:
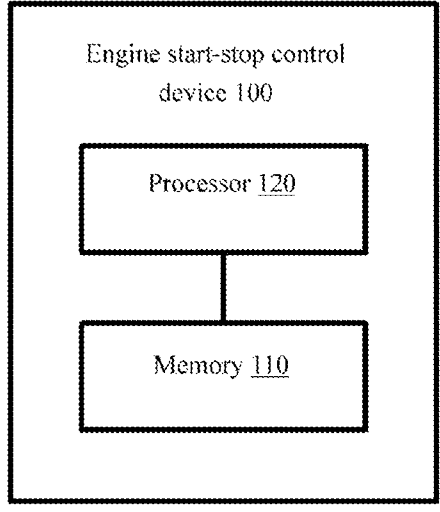
FIG. 15 is a schematic structural diagram of an engine start-stop control device for a hybrid electric vehicle according to an embodiment of the present invention.

On the basis of the same technical concept, an embodiment of the present invention further provides an engine start-stop control device 100 for a hybrid electric vehicle. As shown in FIG. 15, the engine start-stop control device 100 includes a memory 110 and a processor 120. The memory 110 stores a control program that, when executed by the processor 120, is used to implement the engine start-stop control method for the hybrid electric vehicle in any of the foregoing embodiments or a combination of the embodiments.

The engine start-stop control device of this embodiment can reasonably perform the engine start-stop control for various situations that may occur in the vehicle by determining an engine start-stop related event, determining the level of the engine start-stop related event, and then performing engine start-stop control according to the engine start-stop related event and the level thereof, thereby improving the operating efficiency of the vehicle and the user experience.

On the basis of the same technical concept, an embodiment of the present invention further provides a hybrid electric vehicle, including a hybrid power system and the engine start-stop control device 100 for the hybrid electric vehicle described in the previous embodiment. The hybrid power system may be, for example, a dual-motor hybrid power system as shown in FIG. 1.

At this point, it should be recognized by those skilled in the art that although exemplary embodiments of the present invention have been exhaustively shown and described herein, many other variations or modifications consistent with principles of the present invention can be directly identified or deduced from the present disclosure of the present invention without departing from the spirit and scope of the present invention. Therefore, the scope of the present invention should be understood and affirmed as covering all these variations or modifications.

What is claimed is:

1. An engine start-stop control method for a hybrid electric vehicle, applied to an engine start-stop control device for a hybrid electric vehicle, wherein:

the engine start-stop control device for the hybrid electric vehicle comprises a memory and a processor, and the memory stores a control program that, when executed by the processor, is used to implement the engine start-stop control method; and the engine start-stop control method comprises:

obtaining a target parameter or a target signal, which is engine start-stop related, of the hybrid electric vehicle;

determining, according to the target parameter or target signal, whether an engine start-stop related event occurs;

in response to that the engine start-stop related event occurs, determining a level of the engine start-stop related event; and performing engine start-stop control according to the engine start-stop related event and the level thereof; wherein the engine start-stop related event comprises at least one of the following: an energy management related start-stop event, a driving behavior related start-stop event, an engine state related start-stop event, an external controller request start-stop event, and other condition related start-stop events;

the level of the engine start-stop related event comprises a first level and a second level, and the second level is higher than the first level;

when the level of the engine start-stop related event is the first level, the step of performing engine start-stop control according to the engine start-stop related event and the level thereof comprises:

keeping the engine in operation under the condition that the engine has operated;

when the level of the engine start-stop related event is the second level, the step of performing engine start-stop control according to the engine start-stop related event and the level thereof comprises:

requesting and controlling the engine to start under the condition that the engine has stopped;

the level of the external controller request start-stop event is the second level, and the external controller request start-stop event comprises at least one of the following: air conditioner controller request start and driver leaving request start;

the target signal comprises a start request signal of an air conditioner controller;

the step of determining, according to the target parameter, whether an engine start-stop related event occurs comprises:

when the start request signal of the air conditioner controller is received, determining that the air conditioner controller request start occurs; and/or the target parameter comprises a current operating state of the vehicle, a current vehicle speed and a driver state; and the step of determining, according to the target parameter, whether an engine start-stop related event occurs comprises:

when the current operating state of the vehicle is a driving cycle activation state, the current vehicle speed is 0, and the driver state is leaving, determining that the driver leaving request start occurs.

2. The engine start-stop control method according to claim 1, wherein when a plurality of engine start-stop related events occur, the engine start-stop control is performed according to the highest level of the plurality of engine start-stop related events.

3. The engine start-stop control method according to claim 1, wherein the level of the energy management related start-stop event is the second level, and the energy management related start-stop event comprises at least one of the following: driver demand power related start-stop, battery power balance related start-stop, battery state of charge (SOC) protection related start-stop, and battery available discharge power related start-stop.

4. The engine start-stop control method according to claim 3, wherein the target parameter comprises a current operating state of the engine, a temperature of engine coolant, a current vehicle speed, an actual SOC value of a battery, a target SOC value of the battery, and a driver demand power; the driver demand power related start-stop comprises driver demand power related start and driver demand power related stop;

the step of determining, according to the target parameter, whether an engine start-stop related event occurs comprises:

determining, according to the current operating state of the engine, whether the current state of the engine is operating or stopped;

when the current state of the engine is stopped, determining a start power limit of the engine according to the temperature of the engine coolant, the current vehicle speed, the actual SOC value of the battery and the target SOC value of the battery;

determining whether the driver demand power is greater than the start power limit, and in response to that the driver demand power is greater than the start power limit, determining that the driver demand power related start occurs;

when the current state of the engine is operating, determining a stop power limit of the engine according to the current vehicle speed, the actual SOC value of the battery and the target SOC value of the battery; and determining whether the driver demand power is less than the stop power limit, and in response to that the driver demand power is less than the stop power limit, determining that the driver demand power related stop occurs;

the step of performing engine start-stop control according to the engine start-stop related event and the level thereof comprises:

when it is determined that the driver demand power related start occurs, requesting and controlling the engine to start; and when it is determined that the driver demand power related stop occurs, requesting and controlling the engine to stop.

5. The engine start-stop control method according to claim 3, wherein the target parameter comprises a current operating state of the engine, a current vehicle speed and an actual SOC value of the battery;

the step of determining, according to the target parameter, whether an engine start-stop related event occurs comprises:

when the current operating state of the engine is stopped, determining a start SOC limit and a stop SOC limit according to the current vehicle speed; and determining whether the actual SOC value of the battery is less than the start SOC limit, and in response to that the actual SOC value of the battery is less than the start SOC limit, determining that the battery power balance related start-stop occurs;

the step of performing engine start-stop control according to the engine start-stop related event and the level thereof comprises:

requesting and controlling the engine to start to charge the battery; and when the actual SOC value of the battery reaches the stop SOC limit, requesting and controlling the engine to stop, wherein after determining that the battery power balance related start-stop occurs, the step of determining, according to the target parameter, whether an engine start-stop related event occurs further comprises:

determining whether the actual SOC value of the battery is less than a preset charging priority enter limit;

the step of performing engine start-stop control according to the engine start-stop related event and the level thereof further comprises:

when it is determined that the actual SOC value of the battery is less than the preset charging priority enter limit, after the engine is requested and controlled to start, first charging the battery in a charging priority mode until the actual SOC value of the battery reaches a preset charging priority exit limit; and then charging the battery in a general charging mode.

6. The engine start-stop control method according to claim 3, wherein the target parameter comprises an actual SOC value of the battery;

the step of determining, according to the target parameter, whether an engine start-stop related event occurs comprises:

determining whether the actual SOC value of the battery is less than a preset battery SOC protection limit, the battery SOC protection limit being the sum of a minimum SOC value allowable for the battery and a predetermined margin; and in response to that the actual SOC value of the battery is less than a preset battery SOC protection limit, determining that the battery SOC protection related start-stop occurs;

the step of performing engine start-stop control according to the engine start-stop related event and the level thereof comprises:

requesting and controlling the engine to start to charge the battery until the actual SOC value of the battery is higher than the preset battery SOC protection limit.

7. The engine start-stop control method according to claim 3, wherein the target parameter comprises a temperature of a battery and/or an actual SOC value of the battery, and a vehicle operating demand power;

the step of determining, according to the target parameter, whether an engine start-stop related event occurs comprises:

determining an available discharge power of the battery according to the temperature of the battery and/or the actual SOC value of the battery; and determining whether the available discharge power of the battery is less than the vehicle operating demand power, and in response to that the available discharge power of the battery is less than the vehicle operating demand power, determining that the battery available discharge power related start-stop occurs;

the step of performing engine start-stop control according to the engine start-stop related event and the level thereof comprises:

requesting and controlling the engine to start to drive the vehicle to operate.

8. The engine start-stop control method according to claim 1, wherein the other condition related start-stop events comprise at least one of the following:

fan control related start-stop, the level of which is the first level;

factory mode request start-stop, the level of which is the second level;

related start-stop after vehicle collision, the level of which is the second level;

remote start request start-stop, the level of which is the second level;

minimum operating time related start-stop, the level of which is the first level;

low motor available torque, the level of which is the second level;

start after engine start failure, the level of which is the second level;

battery failure request start, the level of which is the second level;

motor failure request start, the level of which is the second level, wherein when the engine has operated and a duty ratio of fan control is higher than a calibrated threshold, it is determined that the fan control related start-stop occurs, and under the condition that the engine has operated, the engine is kept in operation until the duty ratio of fan control is lower than the calibrated threshold;

when a factory mode of the vehicle is triggered, it is determined that the factory mode request start-stop occurs;

after the vehicle collides, it is determined that the related start-stop after vehicle collision occurs;

when a remote start request is received from a driver, it is determined that the remote start request start-stop occurs;

when the engine is being started or after the engine has been successfully started, it is determined that the minimum operating time related start-stop occurs, and the engine is kept in operation for at least a second preset duration under the condition that the engine has operated;

when a ratio of the available torque of the motor to a maximum torque of the motor is less than a preset ratio, it is determined that the low motor available torque occurs;

when a battery fails, it is determined that the battery failure request start occurs;

when a mode of the motor does not respond to a request, a torque output path of the motor does not respond to a request, or the mode of the motor is a failure mode, it is determined that the motor failure request start occurs.

9. An engine start-stop control device for a hybrid electric vehicle, comprising a memory and a processor, the memory storing a control program that, when executed by the processor, is used to implement the engine start-stop control method according to claim 1.

10. A hybrid electric vehicle, comprising a hybrid power system and the engine start-stop control device for the hybrid electric vehicle according to claim 9.

* * * * *